United States Patent
Ito

(10) Patent No.: US 8,870,261 B2
(45) Date of Patent: Oct. 28, 2014

(54) CRASH REINFORCING MEMBER FOR VEHICLE

(75) Inventor: Yoshinori Ito, Toyota (JP)

(73) Assignee: Aisin Takaoka Co,. Ltd., Aichi (JP)

( * ) Notice: Subject to any disclaimer, the term of this patent is extended or adjusted under 35 U.S.C. 154(b) by 0 days.

(21) Appl. No.: 13/638,506

(22) PCT Filed: Sep. 26, 2011

(86) PCT No.: PCT/JP2011/005369
§ 371 (c)(1),
(2), (4) Date: May 31, 2013

(87) PCT Pub. No.: WO2012/127544
PCT Pub. Date: Sep. 27, 2012

(65) Prior Publication Data
US 2014/0001788 A1    Jan. 2, 2014

(30) Foreign Application Priority Data

Mar. 24, 2011 (JP) .................. 2011-065678

(51) Int. Cl.
*B60J 5/04* (2006.01)
(52) U.S. Cl.
CPC .............. *B60J 5/0444* (2013.01); *B60J 5/0461* (2013.01); *B60J 5/0429* (2013.01)
USPC ...................................... 296/146.6
(58) Field of Classification Search
USPC ................ 296/146.6, 187.03, 187.05, 187.12
See application file for complete search history.

(56) References Cited

U.S. PATENT DOCUMENTS 5,600,931 A * 2/1997 Jonsson .......................... 52/833
5,692,797 A * 12/1997 Dancasiu ................. 296/187.12
(Continued)

FOREIGN PATENT DOCUMENTS

| JP | 200219559 | 1/2002 |
| JP | 2004168141 | 6/2004 |
| JP | 2008179174 | 8/2008 |

(Continued)

*Primary Examiner* — Hilary Gutman
(74) *Attorney, Agent, or Firm* — Sheppard, Mullin, Richter & Hampton LLP

(57) ABSTRACT

[Object] It is an object of the present invention to provide a crash reinforcing member for a vehicle capable of preventing reduction in flexural rigidity as much as possible even if deformation progresses when a load at the time of crash of the vehicle is input.
[Solution] A crash reinforcing member for a vehicle (e.g., door impact beam) includes a long body 10. The body 10 has a hat-shaped opened cross-sectional shape by connecting, with one another, a pair of walls 11, a pair of curved corners 12, a center flange 13, and a pair of outer flanges 14. The body 10 is divided into three sections P1, P2 and P3. A width (C1) of the center flange in the section P1 is wider than a width (C2) of the center flange in the section P2. A cross-sectional area of the curved corner 12 in the section P1 is narrower than a cross-sectional area of the curved corner in the section P2. A cross-sectional height (H1) of the section P1 is higher than a cross-sectional height (H2) of the section P2. The section P3 is provided as a gradually changing portion which smoothly connects the section P1 and the section P2 with each other.

5 Claims, 27 Drawing Sheets

(56) References Cited

U.S. PATENT DOCUMENTS

| | | |
|---|---|---|
| 5,887,938 A | 3/1999 | Topker et al. |
| 6,145,271 A * | 11/2000 | Kossmeier et al. ............. 52/843 |
| 6,290,282 B1 * | 9/2001 | Hortlund et al. ........... 296/146.6 |
| 6,517,142 B2 * | 2/2003 | Gehringhoff et al. ...... 296/146.6 |
| 6,663,169 B2 * | 12/2003 | Gehringhoff et al. .... 296/187.12 |
| 6,679,540 B1 * | 1/2004 | Graber et al. .............. 296/146.6 |

FOREIGN PATENT DOCUMENTS

| | | |
|---|---|---|
| JP | 2010195187 | 9/2010 |
| WO | 9736761 | 10/1997 |
| WO | 2008033066 A1 | 3/2008 |

\* cited by examiner (A)

(B)

(C)

(A)

(B)

(A)

(B)

(C)

(A)

(B)

(C)
[ Comparative Example ]

(A)

(B)

(A)

(B)

(C)

(A)

(B)

(C)

CRASH REINFORCING MEMBER FOR VEHICLE

The present application claims a priority right based on Japanese Patent Application No. 2011-065678 filed at Japanese Patent Office on Mar. 24, 2011.

The present invention relates to a crash reinforcing member for a vehicle mounted on the vehicle for absorbing energy generated when the vehicle crashes and for reducing inward deformation of a vehicle body.

BACKGROUND ART

As one kind of a crash reinforcing member for a vehicle, a door impact beam (also called door guard), mounted on an inner surface of a door of a vehicle, is known. In the past, a door impact beam in which brackets (mounting brackets) are welded to both ends of a pipe-shaped body is widely used. In recent years, however, a door impact beam in which a beam body and brackets are integrally stamped (pressed) is in the mainstream. In the case of the door impact beam having the integrally formed beam body and brackets, a door impact beam having an open cross-sectional shape in which a traverse cross-section of the beam body has a hat-shape becomes widespread.

In the case of a door guard for a vehicle described in patent document 1 for example, a steel plate is stamped (pressed) and a beam body and brackets are integrally formed, a bent portion 1a (including a wall, a center flange and a curved corner) having an R-shaped cross-section is integrally formed on its body portion over its entire length, and flat flanges 1b (corresponding to outer flanges) are respectively formed on upper and lower portions of a base of the bent portion. That is, the hat-shaped cross-sectional shape including the bent portion 1a and the pair of flanges 1b is uniformly formed on the body over its entire length.

A door impact beam disclosed in patent document 2 includes a raised portion 2 (including a wall, a center flange and a curved corner) and bottoms 3 (corresponding to outer flanges) on both sides of the raised portion 2 in its width direction, and these members form a hat-shaped cross-section of a body of the door impact beam. A width of the door impact beam is the largest in its center section in its length direction, the width gradually becomes smaller from the center section toward both ends in the length direction, and the smallest width continues from a portion thereof separated from the center section by a predetermined distance to both the ends in the length direction. Sizes of the hat-shaped cross-section of various portions substantially correspond to the above-described size.

PRIOR ART DOCUMENTS

Patent Documents

Patent Document 1: JP laid open publication No. 2002-19559 (paragraph 0016 and FIG. 1)
Patent Document 2: JP laid open publication No. 2004-168141 (paragraphs 0040 to 0043)

SUMMARY OF THE INVENTION

Problem to be Solved by the Invention

According to the door impact beams in which a cross-sectional shape from its center section to its ends in the longitudinal direction is constant as in the conventional examples, if a load is input at the time of side crash, a concentrated load is applied only to the input point of the load, there is a possibility that the beam is bent at the input point of the load and a wall member opens outward and is deformed. If deformation is generated around the input point of the load, stress concentration is generated only in the vicinity of the input point of the load, plastic strain is generated and as a result, there is a drawback that flexural rigidity becomes lower as the deformation of the beam progresses and a reaction force is abruptly reduced (see a later-described comparative example). In the case of the conventional door impact beams, to compensate such a drawback, it is necessary to enhance the strength of the door impact beam by increasing a thickness of material or a size of the hat-shaped cross-section, and inconvenience such as increase in fabrication cost and in weight is caused.

It is an object of the present invention to provide a crash reinforcing member for a vehicle capable of preventing reduction in rigidity as much as possible even if deformation progresses when a load at the time of crash of a vehicle is input and as a result, capable of maintaining absorbing performance of crash energy.

Means for Solving the Problem

The present invention relates to a crash reinforcing member for a vehicle comprising a long body including a pair of opposed walls each having front and rear ends, a flat center flange disposed between the front ends of the walls, a pair of curved corners which connect the front ends of the walls and the center flange with each other, and a pair of outer flanges extending outward from the rear ends of both the walls, in which a transverse cross-section of the body has a hat-shaped opened cross-sectional shape which opens toward the rear ends of both the walls by the pair of walls, the center flange, the pair of curved corners and the pair of outer flanges, wherein in a range from a center section to one end of the body in its longitudinal direction, the body is divided into a first section which occupies the center section or a portion near the center section, a second section which occupies the one end in the longitudinal direction and a portion near the one end, and a third section which connects the first section and the second section with each other. A width (C1) of the center flange in the first section is wider than a width (C2) of the center flange in the second section, a cross-sectional area of each of the curved corners in the first section is narrower than a cross-sectional area of each of the curved corners in the second section, a cross-sectional height (H1) of the first section is higher than a cross-sectional height (H2) of the second section, and the third section is provided as a gradually changing portion which smoothly connects the first section and the second section with each other.

Preferably, the body includes a first section which occupies the center section of the body, a pair of third sections located on both sides of the first section in its longitudinal direction, and a pair of second sections which are respectively connected with the third sections and which extend to both ends of the body in the longitudinal direction, and the body has a shape which is symmetric with respect to the center section in the longitudinal direction.

According to the crash reinforcing member for a vehicle of the invention, the flat center flange side of the body thereof (side opposite from the opening of the hat-shaped opened cross-sectional shape) is mounted on the vehicle such that the center flange faces a load-inputting direction at the time of crash. Since the crash reinforcing member for a vehicle of the invention has this shape, a value of a second moment of the first section significantly becomes large as compared with the second section, and it is possible to exert a feature that the crash reinforcing member is less prone to deform against a load applied from the flat center flange of the first section. In addition, a non-linear shape exists in the third section (gradually changing portion) which connects the first section and the second section with each other and when a load is received, stress concentration is prone to be generated in a location where the first section and the third section are connected with each other and a location where the second section and the third section are connected with each other as compared with other locations. If the crash reinforcing member for a vehicle receives a crash load, a curving and deforming phenomenon usually progresses around an input point of a load, but according to the invention, the curving and deforming phenomenon progresses at both of the input point of the load and the gradually changing portions and as a result, the load is dispersed and received at three locations. The crash load is dispersed and as a result, plastic strain caused at an early stage of the crash is also dispersed, and a cross-sectional deformation caused by plastic deformation is prevented. Therefore, even if deformation caused by a crash load progresses, abrupt deterioration of flexural rigidity is prevented. As a result, according to the crash reinforcing member for a vehicle of the invention, when the vehicle crashes, it is possible to sustain the crash energy absorbing performance as compared with the conventional technique.

Preferably, a cross-section of each of the pair of curved corners is of an arc shape having a central angle of 90°. When a cross-sectional radius of the curved corner in the first section is defined as "R1" and cross-sectional radius of the curved corner in the second section is defined as "R2", a ratio (R1/R2) of the radius R1 and the radius R2 is set in a range of 1/2 to 1/5.

Since the ratio (R1/R2) is set in the range of 1/2 to 1/5, change of a second moment of area between the first section and the second section becomes clear, and it is possible to effectively disperse the crash load to the third section (gradually changing portion) which connects the first section and the second section with each other. If the ratio (R1/R2) is greater than the 1/2, since a difference between the cross-sectional shapes of the curved corners of the first section and the second section becomes small, there is fear that change of the second moments of area of the first section and the second section becomes unclear, and a crash load is insufficiently dispersed to the gradually changing portion, and only flexural rigidity of the same level as that of the conventional technique can be obtained. If the ratio (R1/R2) is smaller than 1/5, this means that the radius of the curved corner of the first section is excessively small, and there is fear that this may cause inappropriate stress concentration to the curved corner when the cross-sectional shape is deformed.

Preferably, a ratio ((H1−H2)/H1) of a difference between the cross-sectional height (H1) of the first section and the cross-sectional height (H2) of the second section and the cross-sectional height (H1) of the first section is set in a range of 1/10 to 1/2.

Since the ratio ((H1−H2)/H1) is set in the range of 1/10 to 1/2, it is possible to significantly increase a second moment of area of the first section of the body when the vehicle crashes with respect to a second moment of area of the second section. If the ratio ((H1−H2)/H1) is less than 1/10, since a step (difference in height) between the first section and the second section is excessively small, a difference between second moments of area of the first section, the second section and the third section (gradually changing portion) becomes small, and when a crash load is received, an effect of dispersion of the load becomes small. When the ratio ((H1−H2)/H1) becomes greater than 1/2, since the nonlinearity in shape of the gradually changing portion becomes large, strength of a connecting portion of the gradually changing portion which connects to the first section or the second section becomes insufficient, the stress concentration to the gradually changing portion becomes relatively larger than the input point of the load, and there is fear that strength of the entire crash reinforcing member for a vehicle is deteriorated.

In one embodiment of the invention, a cross-sectional height in the third section gradually changes between the cross-sectional height (H1) of the first section and the cross-sectional height (H2) of the second section. A cross-sectional area of each of the curved corners in the third section gradually changes between a cross-sectional area of each of the curved corners in the first section and a cross-sectional area of each of the curved corners in the second section.

In another embodiment (FIGS. 9 and 23 for example) of the present invention, the third section (P23) includes a length of zone which is adjacent to the first section (P21) and which has a cross-sectional height (H1) that is the same as that of the first section, and a remaining zone which is adjacent to the second section (P22), and in the remaining zone, as approaching the second section (P22), a cross-sectional height is gradually reduced toward a cross-sectional height (H2) at the second section. Each of the curved corners of the third section (P23) includes a length of zone which is adjacent to the second section (P22) and which has a cross-sectional area that is the same as that of the second section, and a remaining zone which is adjacent to the first section (P21), and in the remaining zone, a cross-sectional area of each of the curved corners is gradually reduced toward the first section (P21).

According to this configuration, in the third section (gradually changing portion), a position in the longitudinal direction where the cross-sectional shape of the curved corner starts changing and a position in the longitudinal direction where a cross-sectional height starts changing are deviated from each other. That is, the gradually changing portion slows the change of the second moment of area and when a crash load is received, it is possible to adjust a relative degree of the stress concentration of the gradually changing portion with respect to the input point of the load. Hence, by changing the shape of the gradually changing portion, it is possible to appropriately adjust a relation between a load and displacement as the entire crash reinforcing member for a vehicle when the crash load is received.

In another embodiment (FIGS. 11 and 25 for example) of the invention, the third section (P43) includes a length of zone which is adjacent to the second section (P42) and which has a cross-sectional height (H2) that is the same as that of the second section, and a remaining zone which is adjacent to the first section (P41), and in the remaining zone, as approaching the first section (P41), a cross-sectional height is gradually increased toward a cross-sectional height (H1) at the first section. Each of the curved corners of the third section (P43) includes a length of zone which is adjacent to the first section (P41) and which has a cross-sectional area that is the same as that of the first section, and a remaining zone which is adjacent to the second section (P42), and in the remaining zone, a cross-sectional area of each of the curved corners is gradually increased toward the second section (P42).

According to this configuration, in the third section (gradually changing portion), a position in the longitudinal direction where a cross-sectional shape of the curved corner starts changing and a position in the longitudinal direction where a cross-sectional height starts changing are deviated from each other. That is, the gradually changing portion slows the change of the second moment of area and when a crash load is received, it is possible to adjust a relative degree of the stress concentration of the gradually changing portion with respect to the input point of the load. Hence, by changing the shape of the gradually changing portion, it is possible to appropriately adjust a relation between a load and displacement as the entire crash reinforcing member for a vehicle when the crash load is received.

Effect of the Invention

As described above in detail, according to the crash reinforcing member for a vehicle of the present invention, also when the vehicle crashes, the curving and deforming phenomenon progresses at both the input point of the crash load and the gradually changing portions disposed around the input point and as a result, the load is dispersed and the load can be received at three locations. As a result of dispersion of the crash load, since a cross-sectional deformation caused by plastic deformation of the hat-shaped opened cross-sectional shape of the body is prevented relatively till late, even if the deformation of the entire crash reinforcing member progresses, a high rigidity state is maintained and as a result, excellent load resistance is maintained. Characteristics which are inherent in the crash reinforcing member of the invention make it possible to absorb more crash energy when the vehicle crashes as compared with the conventional technique, and to reduce deformation of the vehicle body inward of the vehicle.

The crash reinforcing member for a vehicle of the invention has excellent crash energy absorbing characteristics. Therefore, even if a smaller amount of material is used to reduce weight, it is possible to obtain the same crash absorbing characteristics as that of the conventional crash reinforcing member for a vehicle. Therefore, if the crash reinforcing member of the invention is used, it is possible to reduce the weight of the vehicle, enhance fuel economy of the vehicle, and reduce carbon dioxide.

BRIEF DESCRIPTION OF THE DRAWINGS

FIG. 3 show a half of a door impact beam in accordance with a first embodiment of the present invention, wherein FIG. 3(A) is a plan view, FIG. 3(B) is a side view and FIG. 3(C) is a perspective view;

FIG. 9 show a half of a door impact beam of a second embodiment, wherein FIG. 9(A) is a plan view, FIG. 9(B) is a side view and FIG. 9(C) is a perspective view;

FIG. 11 show a half of a door impact beam of a third embodiment, wherein FIG. 11(A) is a plan view, FIG. 11(B) is a side view and FIG. 11(C) is a perspective view;

FIG. 13 show a half of a door impact beam of a fourth embodiment, wherein FIG. 13(A) is a plan view, FIG. 13(B) is a side view and FIG. 13(C) is a perspective view;

FIG. 14 show a half of a door impact beam of a comparative example, wherein FIG. 14(A) is a plan view, FIG. 14(B) is a side view and FIG. 14(C) is a perspective view;

FIG. 18 show a half of a bumper reinforcement according to a fifth embodiment of the invention, wherein FIG. 18(A) is a plan view, FIG. 18(B) is a side view and FIG. 18(C) is a perspective view;

FIG. 23 show a half of a bumper reinforcement of a sixth embodiment, wherein FIG. 23(A) is a plan view, FIG. 23(B) is a side view and FIG. 23(C) is a perspective view;

FIG. 25 show a half of a bumper reinforcement of a seventh embodiment, wherein FIG. 25(A) is a plan view, FIG. 25(B) is a side view and FIG. 25(C) is a perspective view;

FIG. 27 show a half of a bumper reinforcement of an eighth embodiment, wherein FIG. 27(A) is a plan view, FIG. 27(B) is a side view and FIG. 27(C) is a perspective view.

MODE FOR CARRYING OUT THE INVENTION

[Door Impact Beam]

Figure 1:
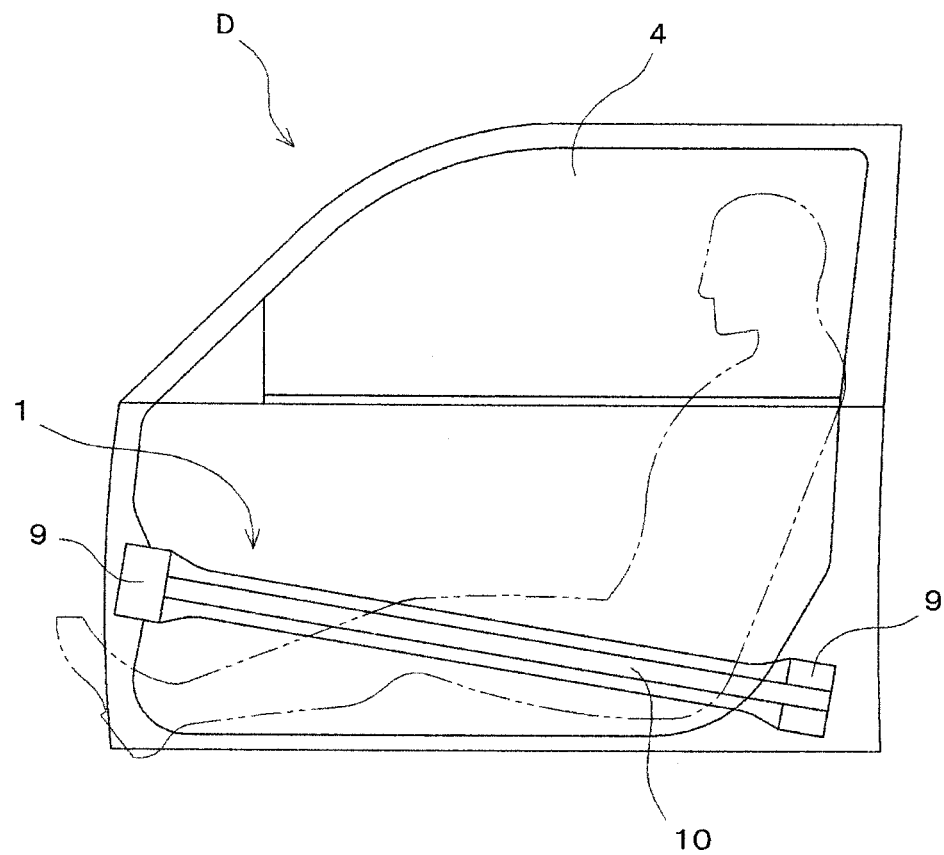
FIG. 1 shows a mounted state of a door impact beam on a door.
Figure 2:
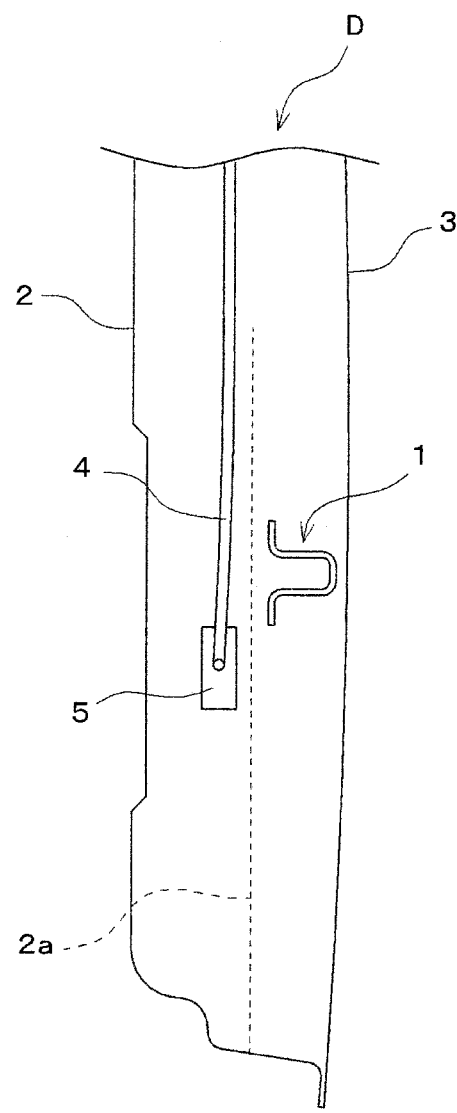
FIG. 2 is a traverse sectional view of the door schematically showing an interior of the door.

Embodiments in which the present invention is embodied as a door impact beam, which is one kind of a crash reinforcing member for a vehicle, will be described with reference to the drawings. As shown in FIGS. 1 and 2, a door impact beam 1 is mounted in a side door D of a passenger car. Generally, the side door D of the passenger car includes a door inner panel 2 located inside of a vehicle body, and a door outer panel 3 located outside of the vehicle body, and a window glass 4 and a glass holder 5 are disposed between both the door panels 2 and 3. As shown in FIG. 2, a step 2a which swells toward the door outer panel 3 is formed on a peripheral edge region of a lower half of the door inner panel 2 to fix the door impact beam 1. The step 2a is located between the window glass 4, the glass holder 5 and the door outer panel 3.

First Embodiment

Figure 3:
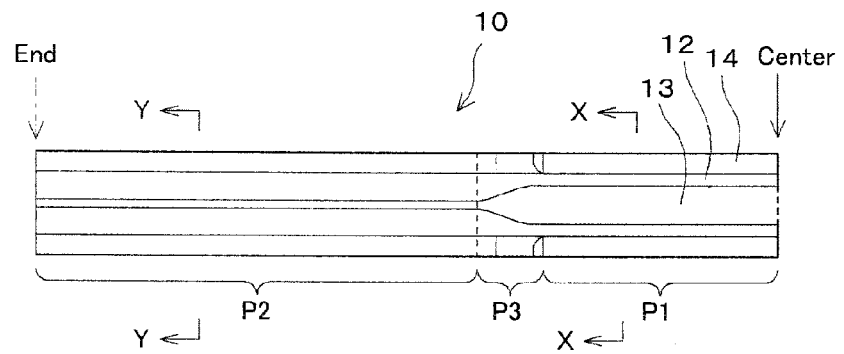
Figure 3:
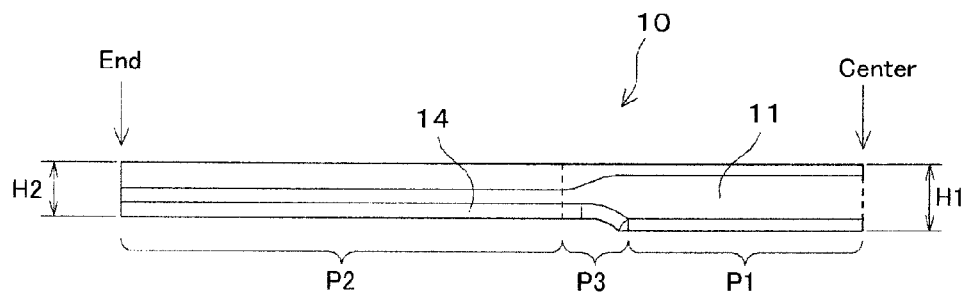
Figure 3:
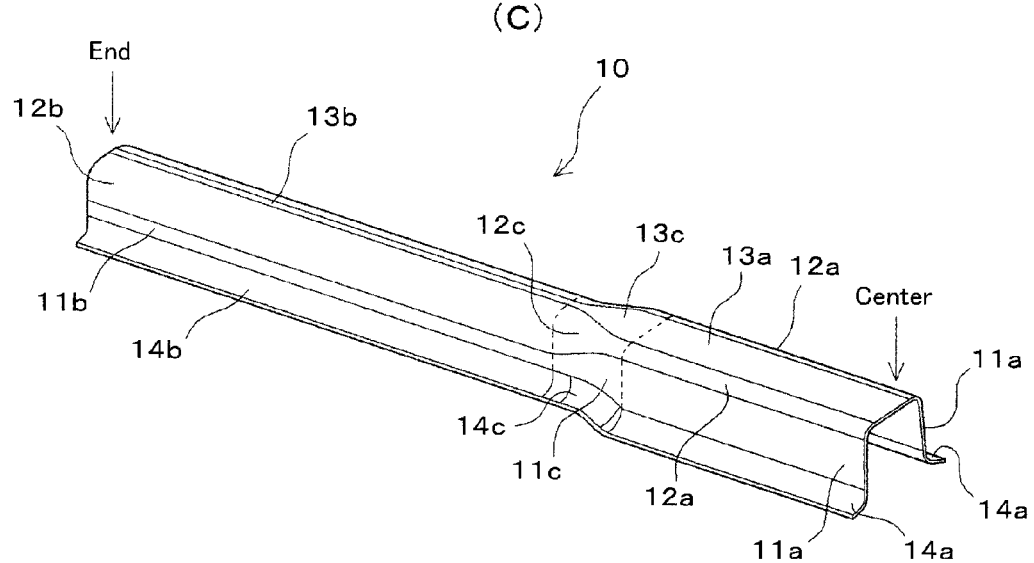
Figure 4:
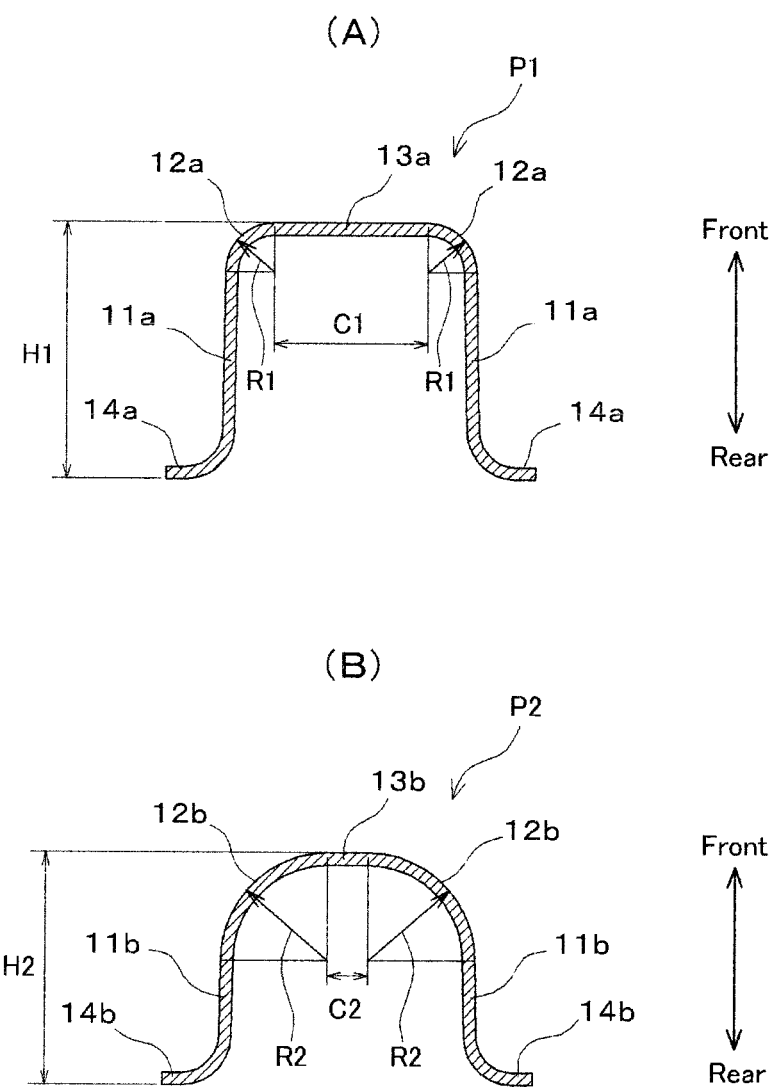
FIG. 4(A) is an enlarged traverse sectional view taken along a line X-X in FIG. 3(A) and FIG. 4(B) is an enlarged traverse sectional view taken along a line Y-Y in FIG. 3(A)

As shown in FIG. 1, according to the door impact beam 1 of a first embodiment, brackets 9 are integrally formed on both ends of a long body 10 in its longitudinal direction. FIG. 3 are a plan view, a side view and a perspective view of the door impact beam 1 in a state where the brackets 9 are removed and the body 10 is cut from its center section. The body 10 of the door impact beam 1 includes a pair of opposed walls 11 (11a, 11b, 11c), a flat center flange 13 (13a, 13b, 13c) disposed between front ends of both the walls 11, a pair of curved corners 12 (12a, 12b, 12c) which connect the front ends of the walls 11 and the center flange 13 with each other, and a pair of outer flanges 14 (14a, 14b, 14c) extending outward (vertical direction in FIG. 3(A) and lateral direction in FIG. 4) from rear ends of both the walls 11. As shown in FIG. 4, the body 10 has a hat-shaped opened transverse sectional shape by connecting the pair of walls 11, the center flange 13, the pair of curved corners 12, and the pair of outer flanges 14 with each other. Here, a "front and rear" direction indicated by the terms "front end" and "rear end" for describing the shape of the door impact beam 1 is the vertical direction in FIG. 4.

The body 10 of the door impact beam 1 according to the first embodiment is divided into a first section P1 which occupies a center section of the body 10 in the longitudinal direction and a portion in the vicinity of the center section, a pair of second sections P2 which occupy both ends of the body 10 in the longitudinal direction and a portion in the vicinity of the both ends, i.e., a portion connected with the bracket 9, and a pair of third sections (gradually changing portions) P3 which are located between the first section P1 and the second section P2 and which smoothly connect the first section P1 and the second section P2 with each other.

In the door impact beam 1 of the first embodiment, the first section P1 has such a shape that a value of a second moment of area of the first section P1 significantly becomes greater than that of the second section P2. As shown in FIG. 4(A), a width C1 of the center flange 13a in the first section P1 is wider than a width C2 of the center flange 13b of the second section P2. A cross-sectional area of each of the curved corners 12a in the first section P1 is narrower than a cross-sectional area of each of the curved corners 12b in the second section P2. Since a thickness of the body 10 is uniform at its any location, a cross-sectional area of the curved corner 12 at the portions (P1 to P3) has an interrelationship with a radius (R) of the curved corner 12 at the portions (P1 to P3). An entire cross-sectional height H1 of the first section P1 is higher than an entire cross-sectional height H2 of the second section P2. A difference in the cross-sectional heights is created because the wall 11a is formed higher than the wall 11b.

More specifically, the cross-sections of the curved corners 12a and 12b of the first section P1 and the second section P2 have arc shapes whose central angles are 90°. Preferably, a ratio (R1/R2) of a cross-sectional radius R1 of the curved corner 12a in the first section P1 and a cross-sectional radius R2 of the curved corner 12b in the second section P2 is set in a range of 1/2 to 1/5. It is preferable that a ratio ((H1−H2)/H1) of a difference between the cross-sectional height H1 of the first section and the cross-sectional height H2 of the second section and the cross-sectional height H1 of the first section P1 is set in a range of 1/10 to 1/2. The ratio of the cross-sectional heights by which most preferable characteristics can be obtained is 1/5. Since the first section P1 and the second section P2 have the above-described difference in shapes, a second moment of area of the first section P1 becomes greater than a second moment of area of the second section P2 by 50% or more. As is apparent from the difference in the second moments of area, strength of the first section P1 against bending moment is significantly higher than that of the second section P2.

At the third sections (gradually changing portions) P3, to smoothly connect the first section P1 and the second sections P2 with each other, shapes of the wall 11c, the curved corner 12c and the center flange 13c change depending upon their positions in the longitudinal direction. A portion of the center flange 13c which is connected with the first section P1 is formed wide such that this portion has the same width C1 as that of the center flange 13a of the first section P1, and a portion of the center flange 13c which is connected with the second section P2 is formed narrow such that this portion has the same width C2 as that of the center flange 13b of the second section P2. The change in width of the center flange 13c is gentle in the vicinity of the first section P1, becomes large and constant toward the second section P2, and again becomes gentle in the vicinity of the second section P2. The change in radius of a cross-section of the curved corner 12c is gentle in the vicinity of a location where the curved corner 12C is connected with the first section P1, becomes large and constant toward the second section P2, and again becomes gentle in the vicinity of the second section P2. Further, a height of the wall 11c of the gradually changing portion P3 is the same as that of the wall 11a at a location where the wall 11c is connected with the wall 11a of the first section P1, first abruptly becomes low toward the second section P2 and then gradually gently becomes low and becomes the same height as that of the wall 11b of the second section P2. As a result, the cross-sectional height of the gradually changing portion P3 is H1 at the location where it is connected with the first section P1, first abruptly becomes low toward the second section P2, and then gently becomes low, and becomes H2 that is the same as that of the second section P2 in the vicinity of the second section P2 (see FIG. 3). The outer flange 14c of the gradually changing portion P3 smoothly connects the first section P1 and the second section P2 with each other. Since the gradually changing portion P3 has such a non-linearity shape, when the door impact beam 1 receives a crash load, stress concentration is relatively prone to be generated on the gradually changing portion P3.

The door impact beam 1 of the first embodiment is fabricated by integrally forming a metal plate material (high-tension steel plate having a thickness of 1 to 4 mm for example) by means of stamping (pressing). The pressing formation technique may be any one of hot-press and cold-press, but the hot-press is more preferable. In the hot-press, a metal plate material is heated to a predetermined high temperature immediately before stamping (pressing), and the high temperature metal plate material is subjected to stamping machining using a stamping die which is cooled relative to the high temperature metal plate material. According to general hot-press, a tensile strength can remarkably be enhanced by a die quenching effect, and stability of size after formation can be enhanced. As the metal plate material, it is possible to use galvanized steel plate, molten galvanized steel plate, alloying molten galvanized steel plate and aluminum-plated steel plate, in addition to the high-tension steel plate.

As shown in FIGS. 1 and 2, the door impact beam 1 of the first embodiment is disposed such that an opening of the hat-shape opened cross-section of the rear end of the wall 11 is oriented to the door inner panel 2, and the door impact beam 1 is mounted on a door D. Normally, the door impact beam 1 is fixed into the door by spot-welding the brackets 9 on both ends of the beam to the front and rear steps 2a of the door inner panel 2. Since the steps 2a of the door inner panel swell toward the door outer panel 3, the center flange 13 of the door impact beam 1 is disposed close to the inner surface of the door outer panel 3 when the mounting operation of the door outer panel 3 is completed after the door impact beam 1 is fixed to the door inner panel 2.

Comparative Example

Figure 14:
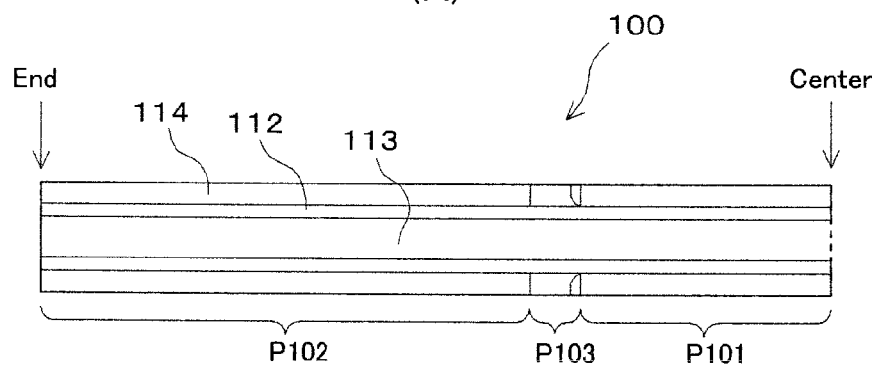
Figure 14:
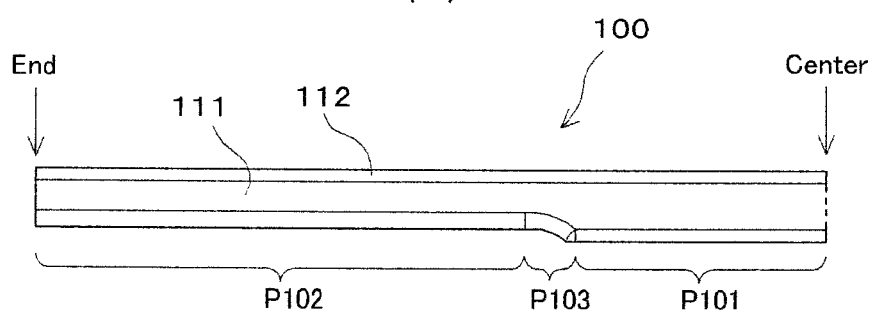
Figure 14:
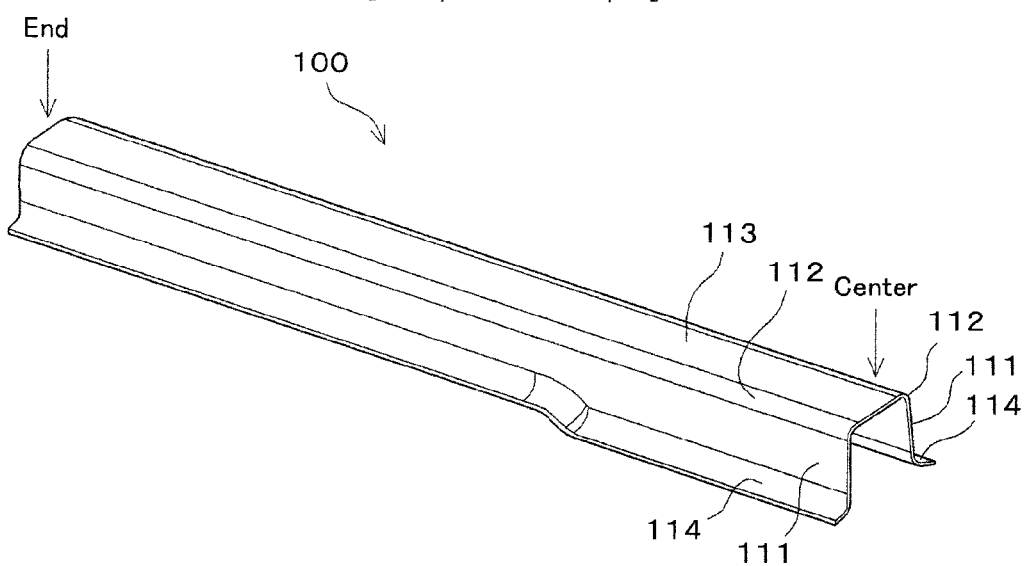

A door impact beam 100 of a comparative example which is to be compared with the door impact beam 1 of the first embodiment will be described using FIG. 14. Materials used, a fabrication method and a mounting position of the door impact beam 100 of the comparative example are the same as those of the door impact beam 1, but the door impact beam 100 is different therefrom in its cross-sectional shape. Like the door impact beam 1, the door impact beam 100 of the comparative example has a long body and brackets integrally formed on both ends of the long body. As shown in FIG. 14(C), the body of the door impact beam 100 has a hat-shaped opened cross-sectional shape by connecting, with one another, a center flange 113, a pair of curved corners 112, a pair of walls 111 and a pair of outer flanges 114. As shown in FIG. 14, shapes of the center flange 113, the curved corners 112, the walls 111 and the outer flanges 114 are constant from a center section (a right end in FIG. 14) to a boundary between a later-described first section P101 and a third section (gradually changing portion) P103. A cross-sectional shape in that range is the same as those of various portions of the first section P1 of the door impact beam 1 of the first embodiment. The body of the door impact beam 100 is divided into the first section P101 which occupies a center section thereof and a portion in the vicinity of the center section, a second section P102 which occupies one end of the body in its longitudinal direction and a portion in the vicinity of the one end, and the third section (gradually changing portion) P103 which connects the first section P101 and the second section P102 with each other. A cross-sectional height of the wall 111 in the first section P101 is higher than that in the second section P102. On the other hand, the curved corner 112 of the door impact beam 100 of the comparative example does not have change in shape of the curved corner 12 of the door impact beam 1. For this reason, according to the door impact beam 100, a difference between a second moment of area of the first section P101 and a second moment of area of the second section P102 is smaller than that of the door impact beam 1 (first embodiment), and a degree of the non-linearity in the shape of the third section (gradually changing portion) P103 is also small.

[Evaluation of Performance]

Figure 5:
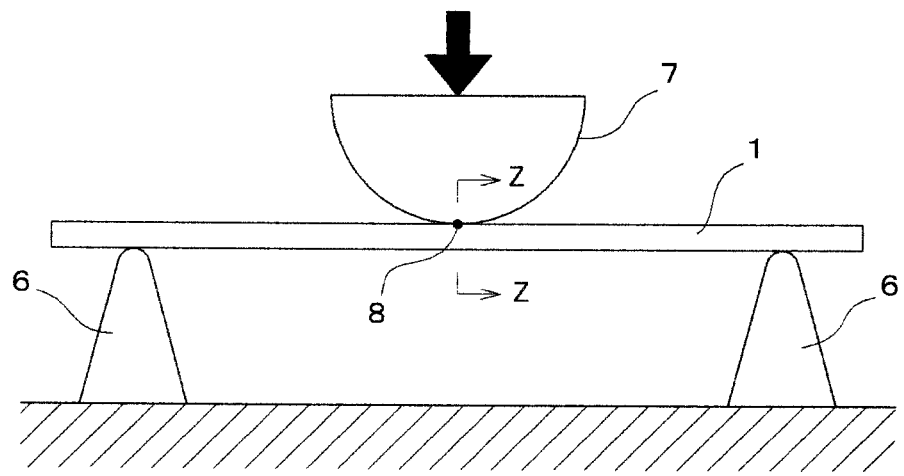
FIG. 5(A) is a front view showing an outline of a performance evaluation test and FIG. 5(B) is an enlarged sectional view taken along a line Z-Z in FIG. 5(A)
Figure 5:
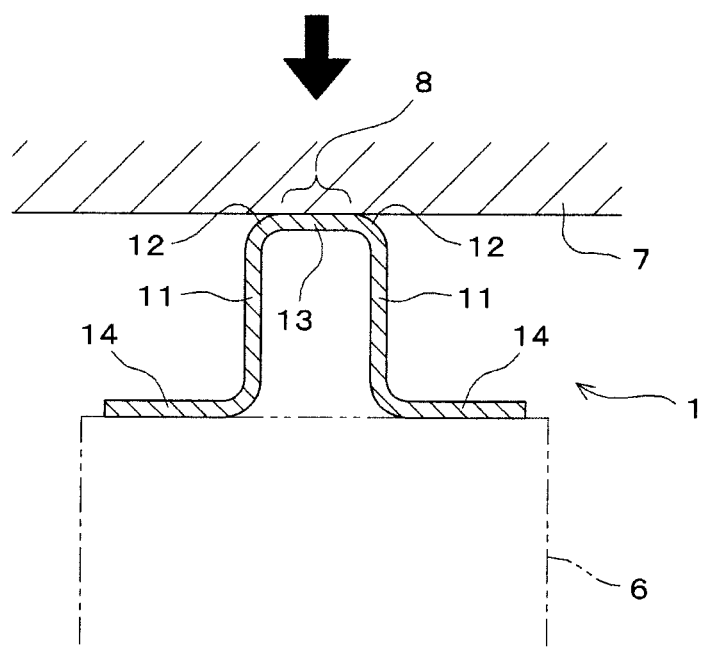

Performance characteristics of the door impact beam 1 of the first embodiment and the door impact beam 100 of the comparative example were evaluated based on a three-point bending test shown in FIG. 5 which assumed that side crash occurred in a state where the door impact beam was mounted inside of the door. As an example, a case in which the three-point bending test is carried out for the door impact beam 1 will be described. As shown in FIG. 5(A), the door impact beam 1 which is to be evaluated is laid between two support legs 6 located at a predetermined distance therebetween, and a load in the vertical direction is applied to an input point 8 of a load of the first section P1 of the door impact beam 1 located between both the support legs 6 using a semi-cylindrical pressing tool 7. To match the mounting structure of the door impact beam 1 shown in FIGS. 1 and 2, the opening of the hat-shaped opened cross-section was oriented downward as shown in FIG. 5(B), and the door impact beam was disposed on both the support legs 6 in such an attitude that the center flange 13 was in contact with a lower surface of the pressing tool 7. In this state, a vertical load was applied to the first section P1 of the door impact beam 1 by the pressing tool 7.

Figure 8:
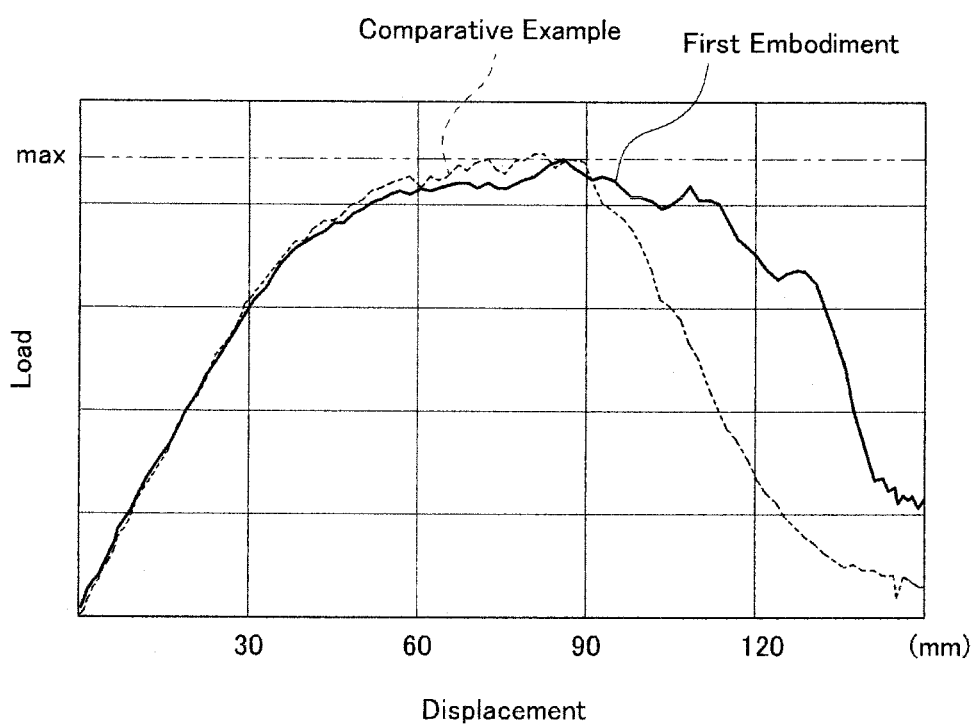
FIG. 8 is a graph showing performance characteristics of the first embodiment and a comparative example.

Results of the three-point bending tests carried out for the door impact beam 1 of the first embodiment and the door impact beam 100 of the comparative example are shown in a graph in FIG. 8. A lateral axis in the graph shows a compulsory displacement amount applied to the door impact beam by the pressing tool 7. A vertical axis in the graph shows a load value of the pressing tool 7. Here, contact surfaces between the pressing tool 7 and the door impact beam are regions having specific areas in practice, but since the areas are extremely small as compared with a surface area of the door impact beam, the areas are handled as points, and the areas are called "input points 8 of the load" in the following description. A load value of the pressing tool 7 applied to the input point 8 of the load matches with a reaction force of the door impact beam. Hence, when the displacement amount is increased, as the load of the pressing tool 7 is not reduced, even if the side crash progresses and the door impact beam is deformed, rigidity of the door impact beam is not reduced, and preferable impact absorbing characteristics are maintained. In FIG. 8, a load value applied to the door impact beam 1 of the first embodiment is shown by a solid line, and a load value applied to the door impact beam 100 of the comparative example is shown by a broken line.

As can be found from the graph in FIG. 8, in the case of the door impact beam 1 of the first embodiment, in a range in which the displacement amount of the input point of the load became 30 mm from 0 mm, there was a tendency that the load value was increased, i.e., as the displacement amount of the input point 8 of the load was increased, the load value was simply increased and this tendency was close to resilient deformation. The load value was gradually increased also after the displacement amount exceeded 30 mm, and the load value became a maximum value (max) before the displacement amount became 90 mm. Thereafter, when the displacement amount exceeded 90 mm, there was a tendency that the load value was gradually reduced. That is, in the case of the door impact beam 1 of the first embodiment, it was apparent that the side crash progressed and the deformation amount of the door impact beam was increased, the reaction force was not abruptly reduced even after plastic strain was partially generated and thus, the crash energy absorbing performance could stably be maintained.

On the other hand, in the case of the door impact beam 100 of the comparative example, in a range in which the displacement amount of the input point 8 of the load became 30 mm from 0 mm, the door impact beam 100 showed a tendency close to the resilient deformation in which a load value was simply increased like the door impact beam 1, and also in a displacement amount range from 30 mm to 90 mm, the load value was gradually increased and reached a maximum value (max). However, after the displacement amount exceeded about 90 mm, there was a tendency that the load value was simply reduced steeply, and the load value applied to the door impact beam 100 when the displacement amount reached 120 mm was reduced to about one-third of the maximum value (max) of the load value of the door impact beam 100. That is, in the case of the door impact beam 100, it was apparent that if the side crash progressed and the displacement amount of the door impact beam was increased, the crash energy absorbing performance was deteriorated relatively early, and the crash energy absorbing performance could not stably be maintained.

Figure 6:
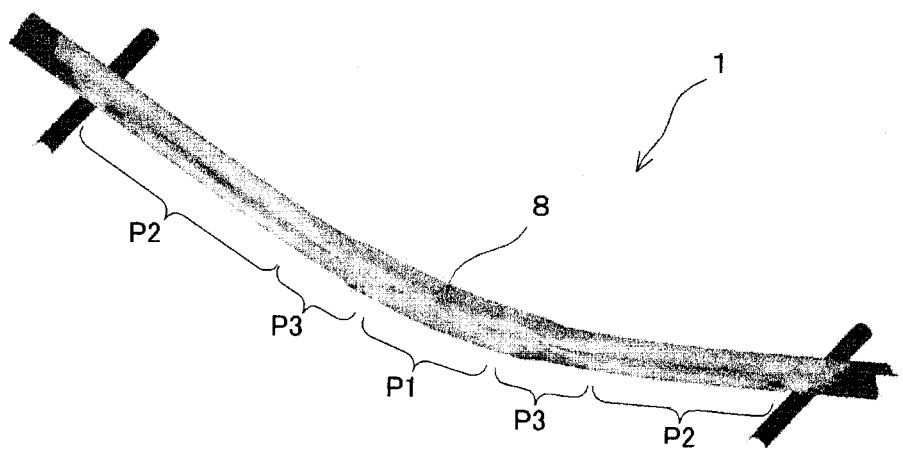
FIG. 6 is a perspective view showing deformation and stress distribution of the door impact beam of the first embodiment after the performance evaluation test.
Figure 7:
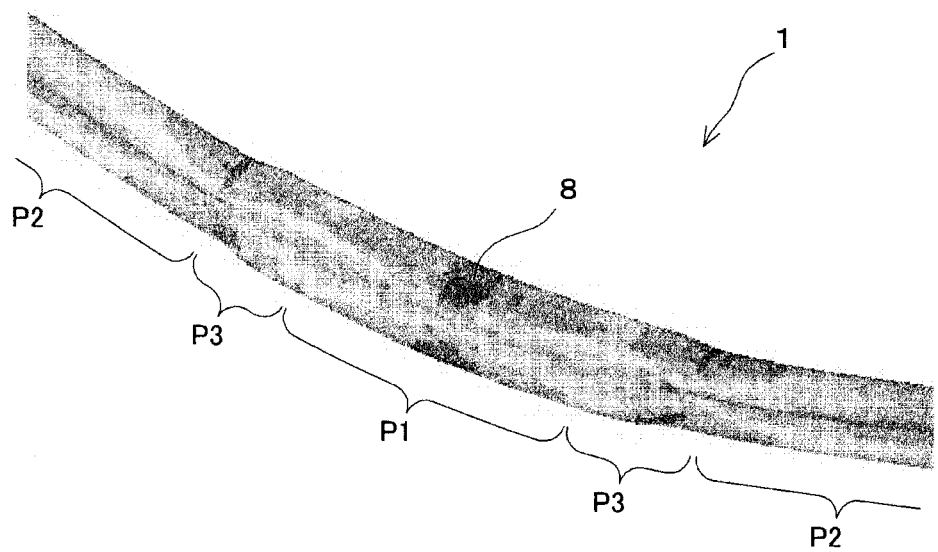
FIG. 7 is a partial enlarged view of FIG. 6.

FIG. 6 shows deformation and stress distribution of the door impact beam 1 of the first embodiment after the performance evaluation test. FIG. 7 is a partial enlarged view of deformation and stress distribution especially in the vicinity of the input point 8 of a load. Stress concentration is generated in the input point 8 of a load of the first section P1. In addition to this, (two) connected locations of the second section P2 and the third section P3 having a second moment of area smaller than that of the first section P1 show stress values which are substantially equal to that of the input point. That is, it was found that a load was dispersed and received by total three points of: the input point 8 of the load; and the connecting locations of the second section P2 and the third section P3. Concerning deformation, it was found that the displacement amount of the input point 8 of the load was the largest, deformation of a location where the second section P2 and the third section P3 are connected with each other was larger than that around the former location, and the door impact beam 1 was deformed such that the entire door impact beam 1 was curved.

Figure 15:
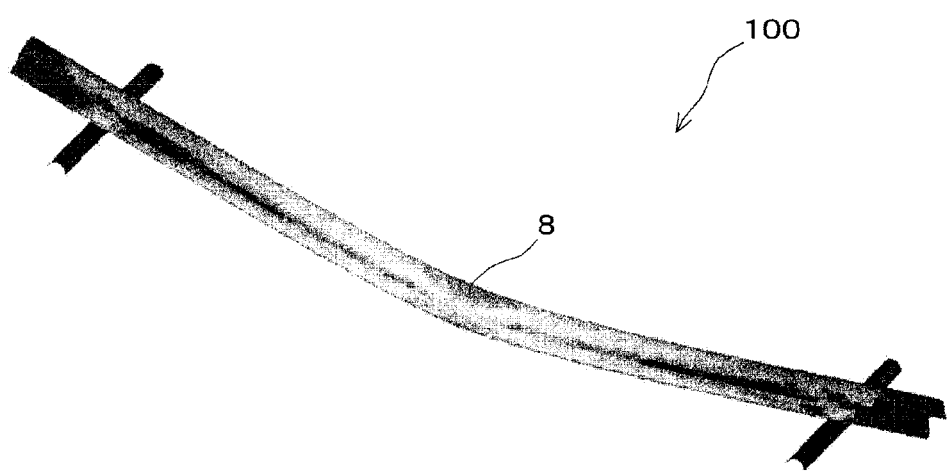
FIG. 15 is a perspective view showing deformation and stress distribution of the door impact beam of the comparative example after the performance evaluation test.
Figure 16:
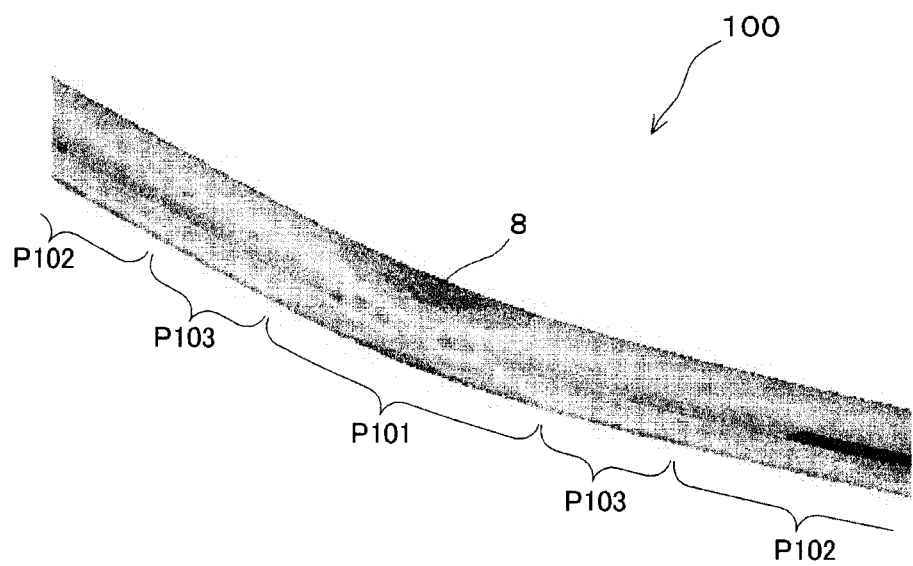
FIG. 16 is a partial enlarged view of FIG. 15.

Deformation and stress distribution of the door impact beam 100 of the comparative example after the performance evaluation test are shown in FIGS. 15 and 16. FIG. 16 is a partial enlarged view of deformation and stress distribution especially in the vicinity of the input point 8 of the load. In the door impact beam 100, outstanding stress concentration is generated in the input point 8 of the load of the first section P1, and a region showing a stress value similar to this can not be found around there. That is, it became apparent that the load was concentrated on one point. Concerning deformation, the input point 8 of the load was deformed most largely, and the impact beam 100 was bent around the input point 8. As described above, in the case of the door impact beam 100 of the comparative example, since the load is concentrated on the input point 8, a plastic strain amount is increased only around the input point 8 of the load, and the hat-shaped opened cross-sectional shape of the body is not maintained, and rigidity is deteriorated relatively early.

According to the performance evaluation test, in the door impact beam 1 of the first embodiment, it is considered that the load is preferably dispersed and thus, the plastic strain is also dispersed, and increase in the plastic strain amount with respect to the displacement amount is relatively delayed. Hence, reduction in rigidity of the door impact beam 1 of the first embodiment is prevented as compared with that of the comparative example, and stable crash energy absorbing performance can be exerted.

Second Embodiment

Figure 9:
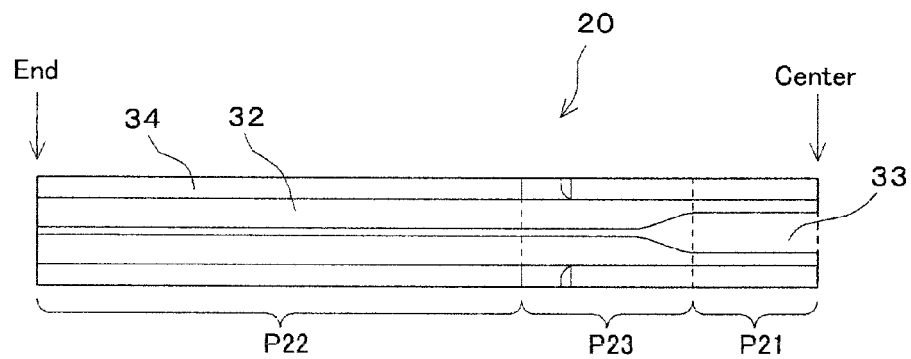
Figure 9:
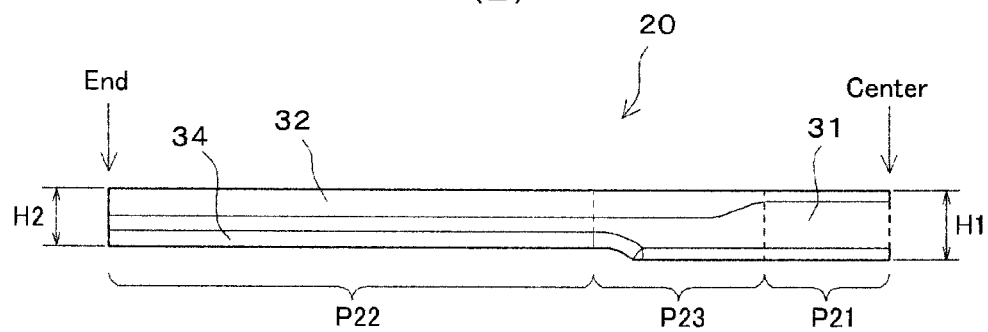
Figure 9:
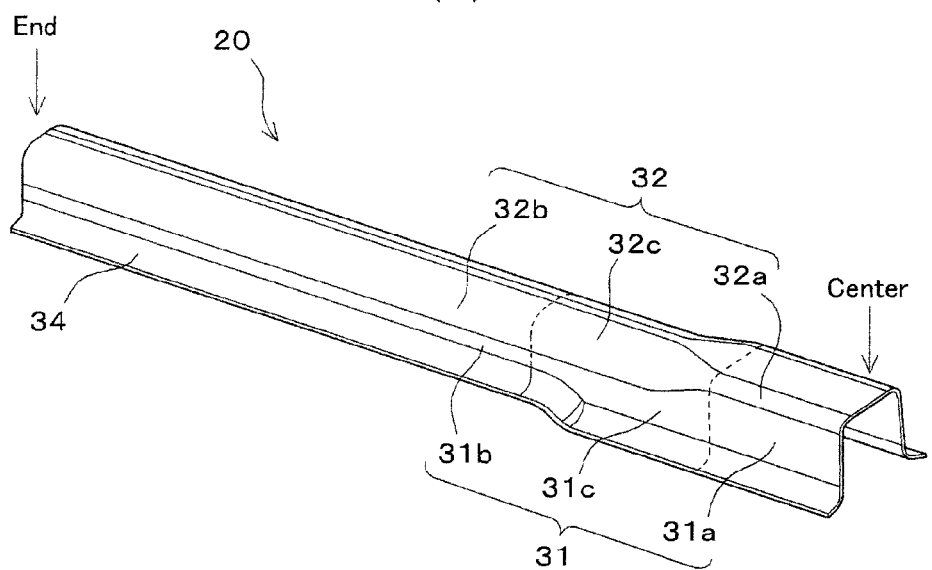

FIG. 9 show a second embodiment of the present invention. As shown in FIGS. 9(A) to 9(C), a body of a door impact beam 20 of the second embodiment includes a center flange 33, a pair of curved corners 32, a pair of wags 31, and a pair of outer flanges 34, and these points are the same as those of the first embodiment. In the second embodiment, a third section (gradually changing portion) P23 of the door impact beam 20 is longer than the third section P3 of the first embodiment in its longitudinal direction.

A curved corner 32c of the third section (gradually changing portion) P23 includes a length of zone which is adjacent to a second section P22 and maintains the same cross-sectional area as that of the second section P22, and a remaining zone which is adjacent to a first section P21. In this remaining zone, a cross-sectional area of the curved corner 32c is gradually narrowed toward the first section P21.

Each of walls 31c of the third section (gradually changing portion) P23 has the same height as that of a wall 31a at a location where the wall 31c is connected with the wall 31a of the first section P21, but the height of the wall 31c gradually becomes low, the wall 31c maintains a constant height at its center section and then, the height is abruptly lowered toward the wall 31b of the second section P22 and eventually, the height becomes the same as that of the wall 31b of the second section P22. In other words, the third section P23 includes the length of zone which is adjacent to the first section P21 and has the same cross-sectional height H1 as that of the first section, and the remaining zone which is adjacent to the second section P22. In this remaining zone, as approaching the second section P22, a cross-sectional height is gradually reduced toward the cross-sectional height H2 in the second section.

As described above, the gradually changing portion P23 of the second embodiment includes a length of zone in which a cross-sectional area of the curved corner 32c becomes the same as that of a curved corner 32b of the second section P22, and a length of zone having a cross-sectional height H1 that is the same as that of the first section. Hence, according to a gradually changing portion P23 of the second embodiment, a shape of the curved corner 32c starts changing from a location where the curved corner 32c is connected with the first section P21, but a position in the longitudinal direction where a cross-sectional height of the curved corner 32c starts changing is close to the second section P22. Therefore, according to the gradually changing portion P23 of the door impact beam 20 of the second embodiment, a second moment of area is gently changed as compared with the door impact beam 1 of the first embodiment.

Figure 10:
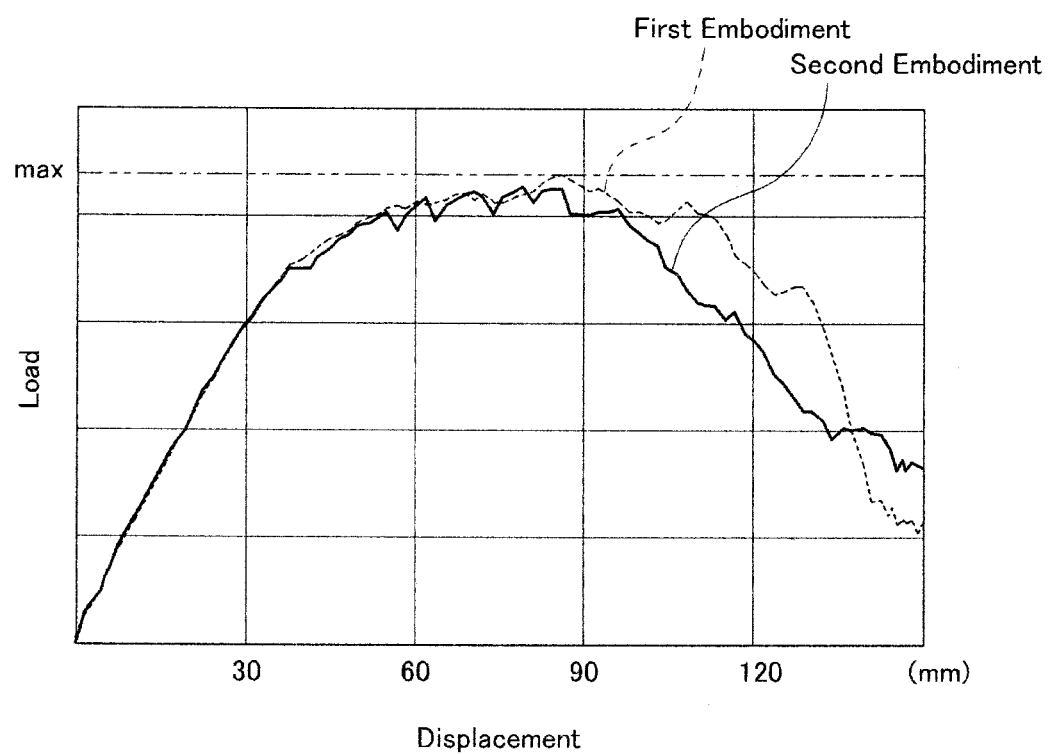
FIG. 10 is a graph showing performance characteristics of the second embodiment and the first embodiment.

Concerning the door impact beam 20 of the second embodiment, a graph showing a relation between a displacement amount and a load of the input point 8 of the load when a three-point bending test is carried out is shown by a solid line in FIG. 10. For comparison, a result of the three-point bending test of the door impact beam 1 of the first embodiment is shown by a broken line in FIG. 10. According to the door impact beam 20, like the door impact beam 1, there was a tendency close to the resilient deformation in which in a displacement amount range of the input point 8 of the load from 0 mm to about 30 mm, a load value was simply increased as a displacement amount was increased, and the load value was gradually increased even after the displacement amount exceeded 30 mm, and the load value became a maximum value (max) before the displacement amount became 90 mm. Thereafter, in a displacement amount region from about 90 mm to about 138 mm, a load value of the door impact beam 20 was always lower than that of the door impact beam 1, and the load value of the door impact beam 20 was gradually reduced, but in a displacement amount region exceeding 138 mm, the load value of the door impact beam 20 became higher than that of the door impact beam 1.

It is considered that the change tendency of the load value with respect to displacement of the door impact beam 20 is different from that of the door impact beam 1 because a dispersion ratio of loads between the input point 8 of the load and the gradually changing portion differs depending upon a degree of deformation due to a difference in shape between the gradually changing portion P23 and the gradually changing portion P3. When the second moment of area of the gradually changing portion P23 is not abruptly changed like the door impact beam 20, it is considered that in a displacement amount region from about 90 mm to about 138 mm, a load is concentrated on the input point 8 of the load and plastic deformation progresses and thus, the load value relatively becomes small. When the displacement amount exceeds 138 mm on the contrary, since the load is supported by the gradually changing portion P23 having relatively small plastic deformation up till then, it is considered that a load value with respect to displacement is relatively largely maintained. By keeping the shape of the gradually changing portion P23 like the door impact beam 20 of the second embodiment, it is possible to appropriately adjust the relation between a load and displacement when the crash load is received.

Third Embodiment

Figure 11:
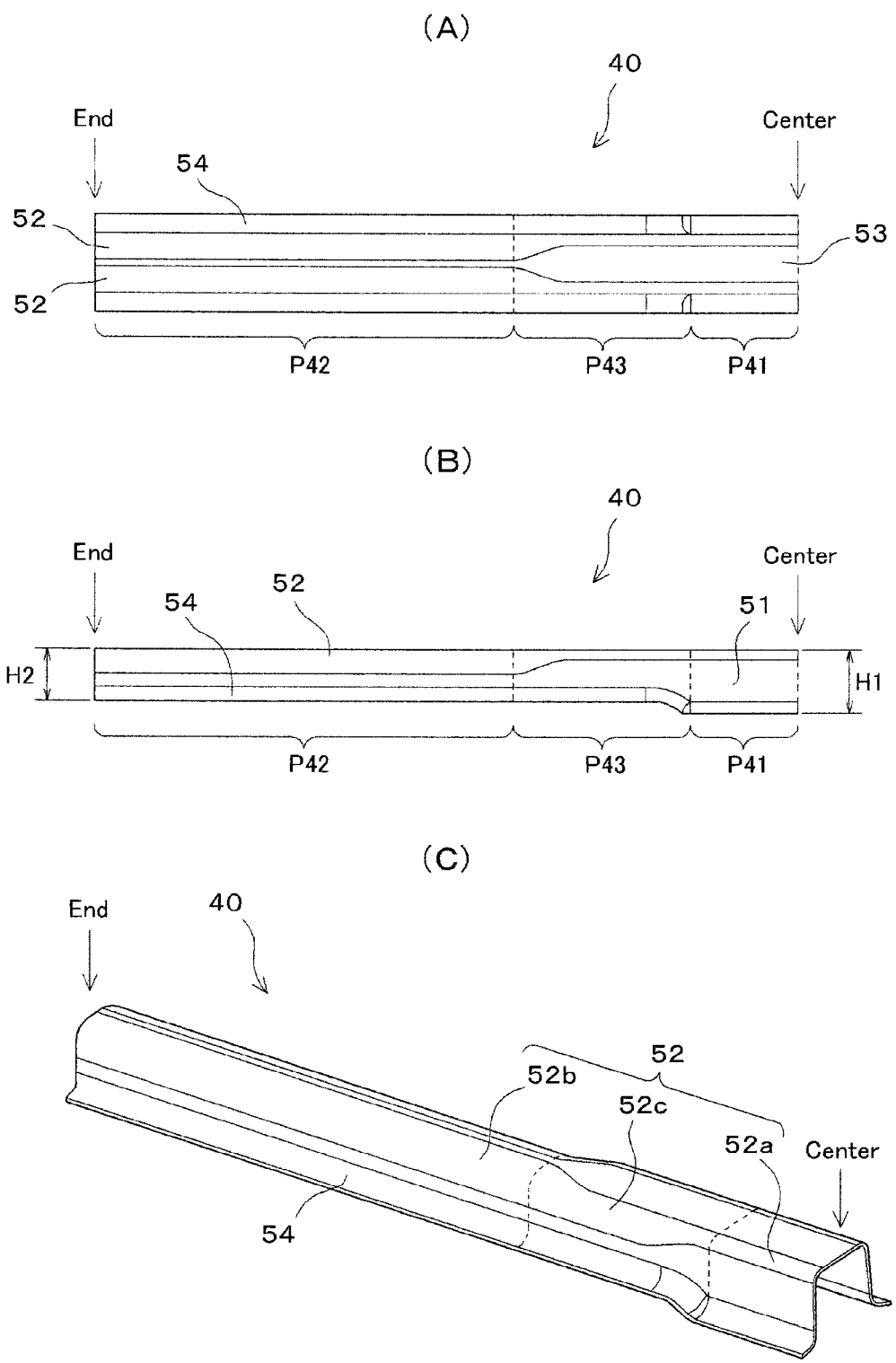

FIG. 11 show a third embodiment of the present invention. As shown in FIGS. 11(A) to 11(C), a body of a door impact beam 40 of the third embodiment includes a center flange 53, a pair of curved corners 52, a pair of walls 51 and a pair of outer flanges 54, and these points are the same as those of the first embodiment. In the third embodiment, a third section (gradually changing portion) P43 of the door impact beam 40 is formed longer than the third section P3 of the first embodiment in its longitudinal direction.

A curved corner 52c of the third section (gradually changing portion) P43 includes a length of zone which is adjacent to a first section P41 and which maintains the same cross-sectional area as that of the first section P41, and a remaining zone which is adjacent to a second section P42. In the remaining zone, the cross-sectional area of the curved corner 52c becomes gradually wider toward the second section P42.

A third section P43 includes a length of zone which is adjacent to the second section P42 and which has the same cross-sectional height H2 as that of the second section P42, and a remaining zone which is adjacent to the first section P41. In the remaining zone, as approaching the first section P41, the cross-sectional height becomes gradually higher toward a cross-sectional height H1 at the first section.

As described above, in the gradually changing portion P43 of the third embodiment, a position in the longitudinal direction where the shape of the curved corner 52c starts changing is close to the second section P42, and a position in the longitudinal direction where the cross-sectional height starts changing is a position where the gradually changing portion P43 is connected with the first section P41. Therefore, although a shape of the door impact beam 40 of the third embodiment is different from that of the second embodiment, the third embodiment has the feature similar to the second embodiment that the second moment of area is gently changed as compared with the door impact beam 1 of the first embodiment.

Figure 12:
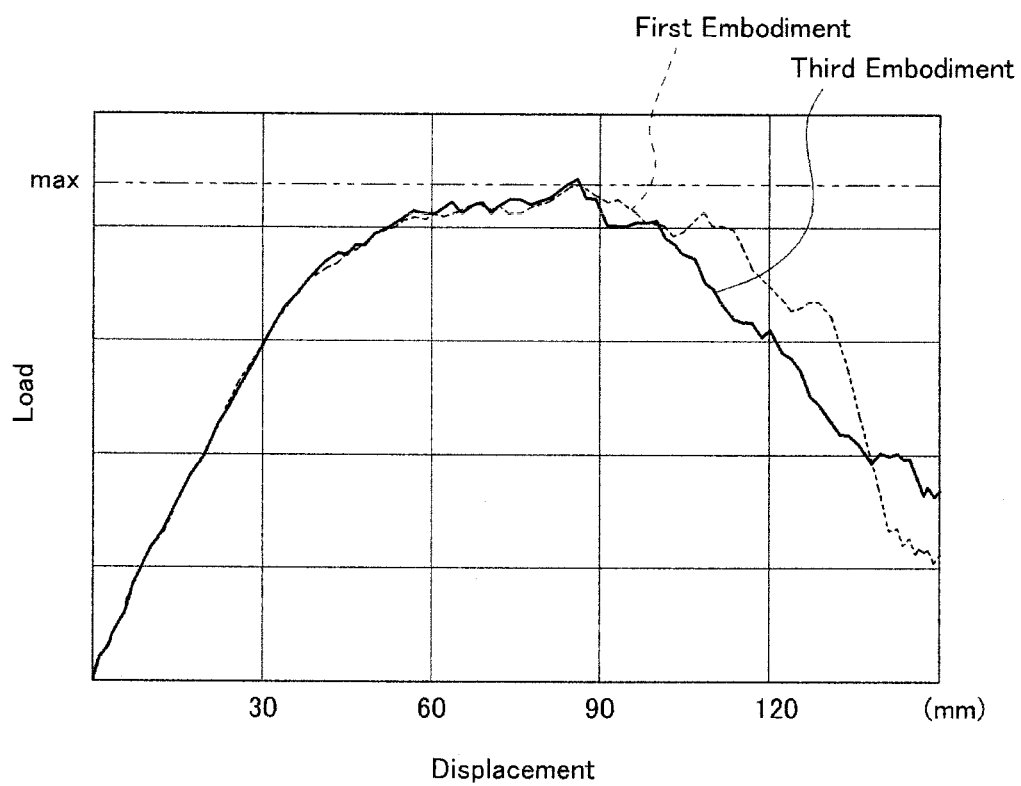
FIG. 12 is a graph showing performance characteristics of the third embodiment and the first embodiment.

Concerning the door impact beam 40 of the third embodiment, a graph showing a relation between a displacement amount and a load of an input point 8 of a load when a three-point bending test was carried out is shown by a solid line in FIG. 12. For comparison, a result of the three-point bending test of the door impact beam 1 of the first embodiment is shown by a broken line in FIG. 12. Like the door impact beam 1, the door impact beam 40 showed a tendency close to the resilient deformation in which a load value was simply increased as a displacement amount was increased in a displacement amount range of the input point 8 of the load from 0 mm to about 30 mm, and the load value was gradually increased even after the displacement amount exceeded 30 mm, and the load value became a maximum value (max) before the displacement amount became 90 mm. Thereafter, in a displacement amount region from about 90 mm to about 138 mm, the load value of the door impact beam 40 was always lower than that of the door impact beam 1 and gradually reduced, but in the displacement amount region exceeding 138 mm, the load value of the door impact beam 40 became higher than that of the door impact beam 1. In this door impact beam 40, reduction in the load value from the displacement of 90 mm to displacement of 138 mm was more gentle than that of the door impact beam 20 of the second embodiment and when the displacement was 138 mm, the load value was 90% of that of the door impact beam 1.

As is apparent from the evaluation of the performance characteristics of the door impact beam 40 of the third embodiment, it is possible to appropriately adjust the relation between the load and the displacement when a crash load is received by arranging the shape of the gradually changing portion.

Fourth Embodiment

Figure 13:
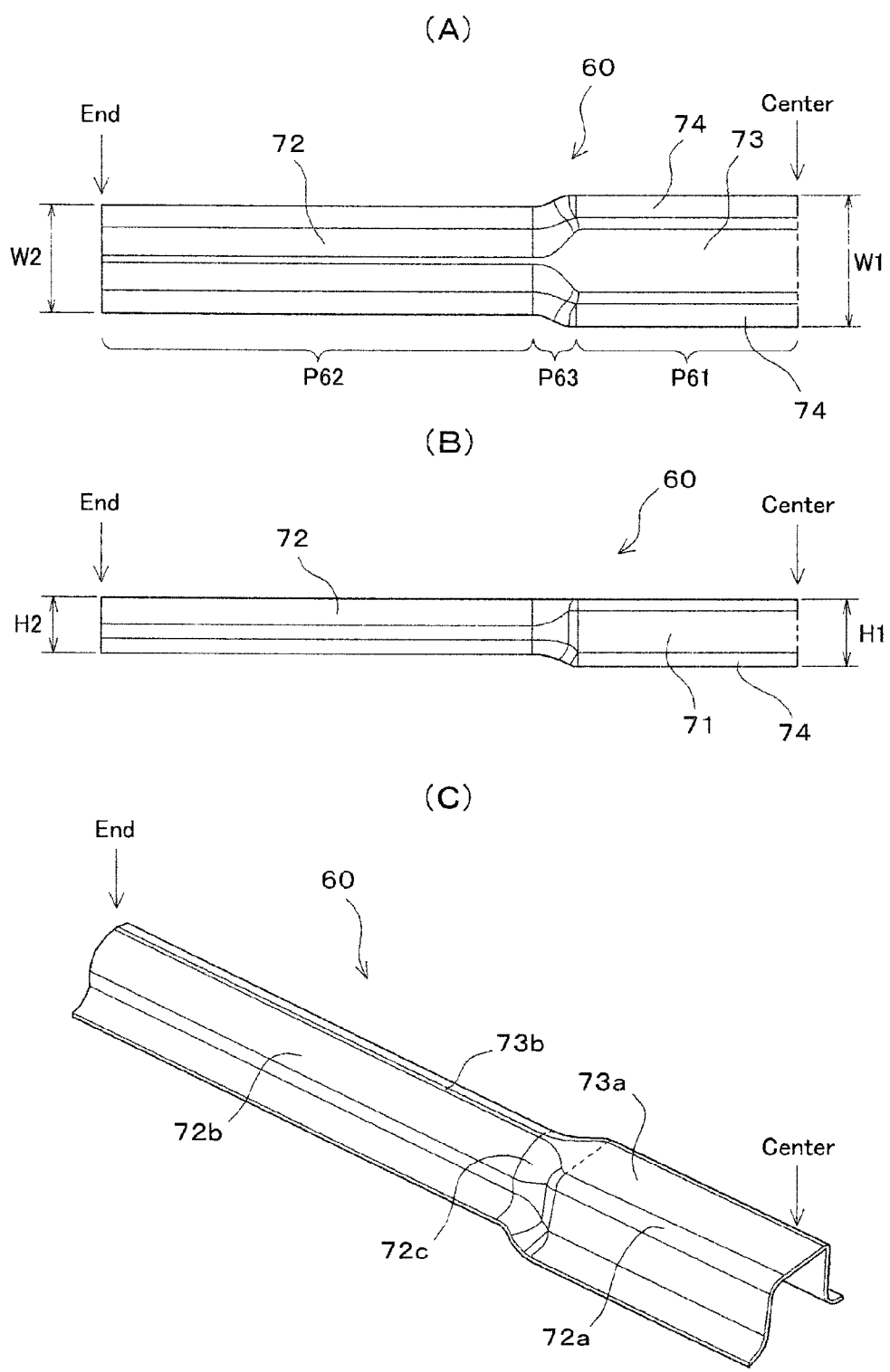

FIG. 13 show a fourth embodiment of the present invention. As shown in FIGS. 13(A) to 13(C), a body of a door impact beam 60 of the fourth embodiment includes a center flange 73, a pair of curved corners 72, a pair of walls 71 and a pair of outer flanges 74, and these points are the same as those of the first embodiment. In the fourth embodiment, a width of the center flange 73a in a first section P61 is wider than that of the center flange 73b of a second section P62. A cross-sectional area of the curved corners 72a in the first section P61 is narrower than that of the curved corner 72b in the second section P62. A cross-sectional height H1 of the first section P61 is higher than a cross-sectional height H2 of the second section P62. A third section P63 is formed as a gradually changing portion which smoothly connects the first section P61 and the second section P62 with each other. A cross-sectional height in the third section P63 gradually changes between the cross-sectional height H1 of the first section and the cross-sectional height H2 of the second section. A cross-sectional area of the curved corners 72c in the third section P63 gradually changes between the cross-sectional area of the curved corners 72a of the first section P61 and a cross-sectional area of the curved corners 72b of the second section P62.

Further, in the fourth embodiment, a width W1 of the first section P61 is wider than a width W2 of the second section P62. Here, each of the widths (W1 and W2) is a distance between an outer end of one of the outer flanges 74 in the first or second section and an outer end of the other outer flange 74. Since the width W1 of the first section P61 is wider than the width W2 of the second section P62, the second moment of area of the first section P61 is further greater than the second moment of area of the second section P62. According to this configuration, a load at the time of side crash can more largely be dispersed toward the second section P62.

[Bumper Reinforcement]

Figure 17:
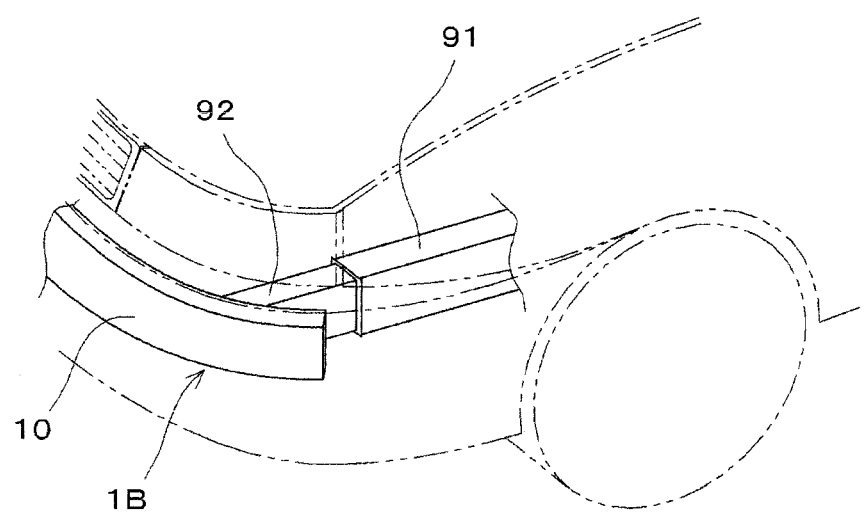
FIG. 17 is a perspective view showing a mounted state of a bumper reinforcement on a vehicle body frame.

Embodiments in which the present invention is embodied as a bumper reinforcement which is one kind of a crash reinforcing member for a vehicle will be described with reference to the drawings. As shown in FIG. 17, a bumper reinforcement (1B) is generally supported through a crush box 92 with respect to a tip end of a side member 91 which configures a frame of a passenger car.

Fifth Embodiment

Figure 18:
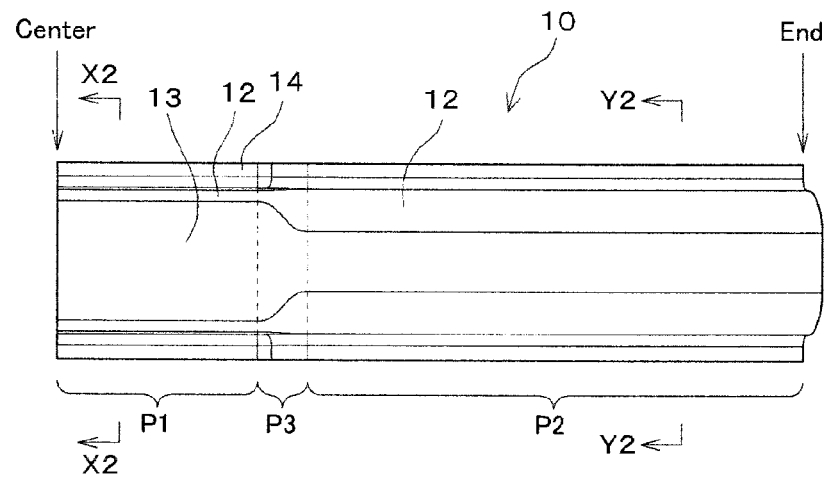
Figure 18:
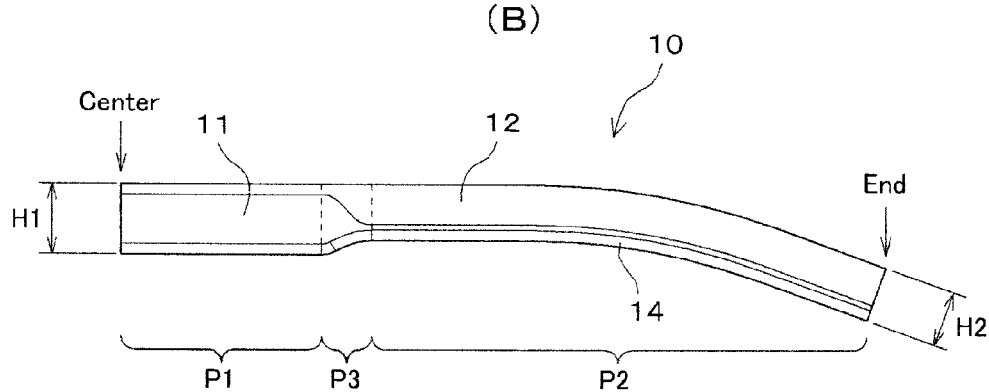
Figure 18:
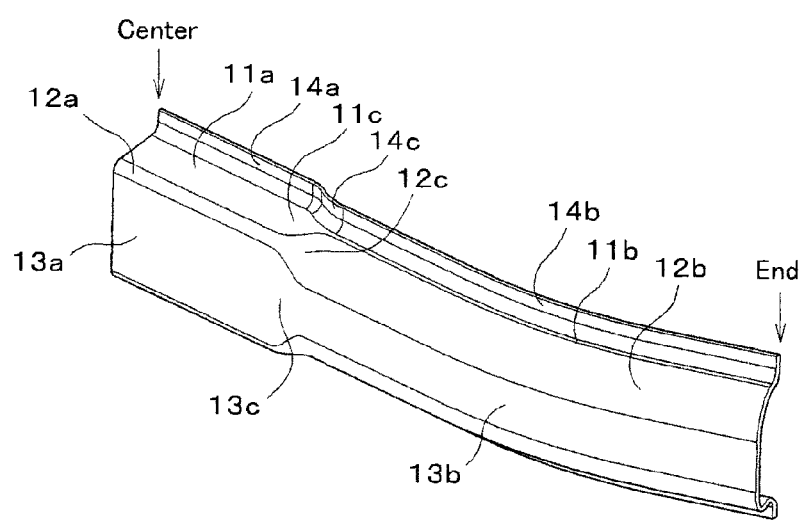
Figure 19:
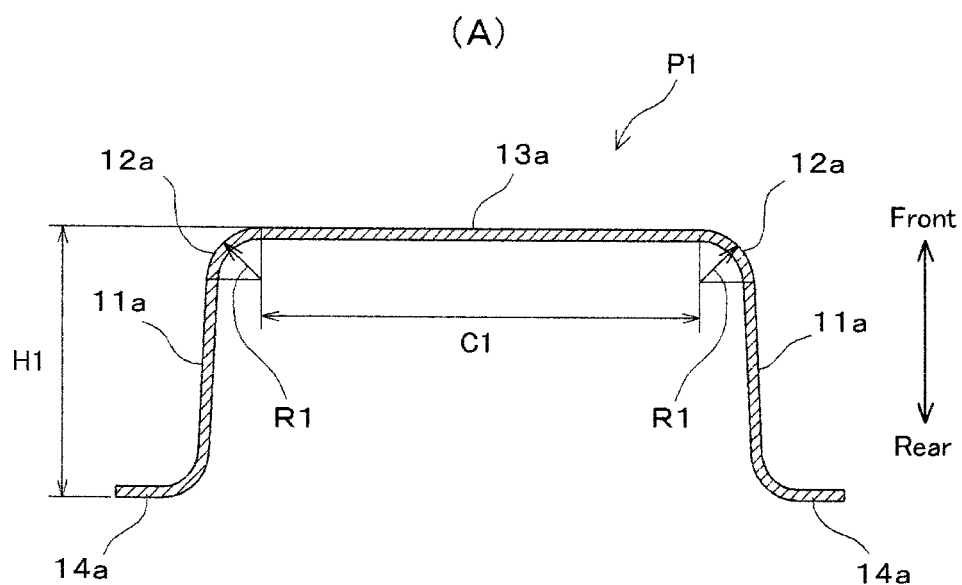
FIG. 19(A) is an enlarged traverse sectional view taken along a line X2-X2 in FIG. 18(A) and FIG. 19(B) is an enlarged traverse sectional view taken along a line Y2-Y2 in FIG. 18(A)
Figure 19:
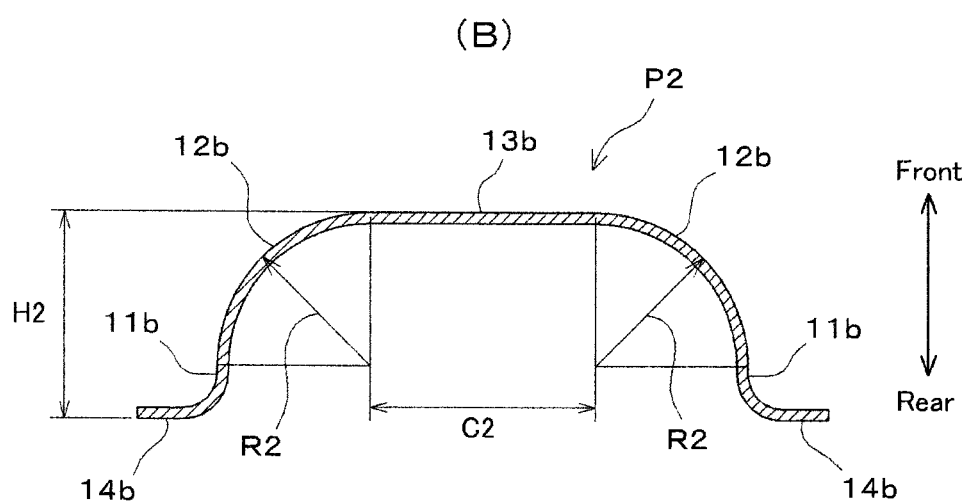

A bumper reinforcement 1B of a fifth embodiment includes a long body 10 like the door impact beam 1 of the first embodiment. A basic structure of the bumper reinforcement 1B of the fifth embodiment is very similar to the structure of the door impact beam 1 of the first embodiment. Hence, in FIGS. 18 to 21, member reference numbers similar to those used in FIGS. 3, 4, 6 and 7 are allocated. FIG. 18 show the bumper reinforcement 1B in a state where the body 10 is cut from its center section. Attention should be given to the fact that positions of a center section and an end of the body 10 shown in FIG. 18 are different from the positions of the center section and the end shown in FIG. 3.

The body 10 of the bumper reinforcement 1B includes a pair of opposed walls 11 (11a, 11b, 11c), a flat center flange 13 (13a, 13b, 13c) disposed between front ends of both walls 11, a pair of curved corners 12 (12a, 12b, 12c) which connect the front ends of the walls 11 and the center flange 13 with each other, and a pair of outer flanges 14 (14a, 14b, 14c) extending outward from rear ends of both the walls 11. The body 10 of the bumper reinforcement 1B includes a hat-shaped opened cross-sectional shape like the first embodiment.

The body 10 of the bumper reinforcement 1B is divided into a first section P1 which occupies a center section of the body 10 in the longitudinal direction and a portion in the vicinity of the center section, a pair of second sections P2 which occupy both ends of the body 10 in the longitudinal direction and a portion in the vicinity of the both ends, and a pair of third sections (gradually changing portions) P3 which are located between the first section P1 and the second sections P2 and which smoothly connect the first section P1 and the second sections P2 with each other.

In the bumper reinforcement 1B, the first section P1 has such a shape that a value of a second moment of area of the first section P1 significantly becomes greater than that of the second section P2. As shown in FIG. 19(A), a width C1 of the center flange 13a in the first section P1 is wider than a width C2 of the center flange 13b of the second section P2. A cross-sectional area of each of the curved corners 12a in the first section P1 is narrower than a cross-sectional area of each of the curved corners 12b in the second section P2. Since a thickness of the body 10 is uniform at its any location, a cross-sectional area of the curved corner 12 at the portions (P1 to P3) has an interrelationship with a radius (R) of the curved corner 12 at the portions (P1 to P3). A cross-sectional height H1 of the first section P1 is higher than an entire cross-sectional height H2 of the second section P2. A difference in the cross-sectional heights is created because the wall 11a is higher than the wall 11b.

More specifically, the cross-sections of the curved corners 12a and 12b of the first section P1 and the second section P2 have arc shapes whose central angles are 90°. Preferably, a ratio (R1/R2) of a cross-sectional radius R1 of the curved corner 12a in the first section P1 and a cross-sectional radius R2 of the curved corner 12b in the second section P2 is set in a range of 1/2 to 1/5. It is preferable that a ratio ((H1−H2)/H1) of a difference between the cross-sectional height H1 of the first section and the cross-sectional height H2 of the second section and the cross-sectional height H1 of the first section P1 is set in a range of 1/10 to 1/2. The ratio of the cross-sectional heights by which especially preferable characteristics can be obtained is 1/5. Since the first section P1 and the second section P2 have the above-described difference in shapes, the second moment of area of the first section P1 becomes greater than the second moment of area of the second section P2 by 50% or more. As is apparent from the difference in the second moment of area, strength of the first section P1 against bending moment is significantly higher than that of the second section P2.

At the third sections (gradually changing portions) P3, to smoothly connect the first section P1 and the second sections P2 with each other, shapes of the wall 11c, the curved corner 12c and the center flange 13c change depending upon their positions in the longitudinal direction. A portion of the center flange 13c which is connected with the first section P1 is formed wide such that this portion has the same width C1 as that of the center flange 13a of the first section P1, and a portion of the center flange 13c which is connected with the second section P2 is formed narrow such that this portion has the same width C2 as that of the center flange 13b of the second section P2. The change in width of the center flange 13c is gentle in the vicinity of the first section P1, becomes large and constant toward the second section P2, and again becomes gentle in the vicinity of the second section P2. The change in a cross-sectional radius of the curved corner 12c is gentle in the vicinity of a connected location with the first section P1, becomes large and constant toward the second section P2, and again becomes gentle in the vicinity of the second section P2. Further, a height of the wall 11c of the gradually changing portion P3 is the same as that of the wall 11a at a location where the wall 11c is connected with the wall 11a of the first section P1, the height first abruptly becomes low toward the second section P2 and then gradually gently becomes low and becomes the same height as that of the wall 11b of the second section P2. As a result, the cross-sectional height of the gradually changing portion P3 is H1 at the location where it is connected with the first section P1, first abruptly becomes low toward the second section P2, and then gently becomes low, and becomes H2 that is the same as that of the second section P2 in the vicinity of the second section P2 (see FIG. 18). The outer flange 14c of the gradually changing portion P3 smoothly connects the first section P1 and the second section P2 with each other. Since the gradually changing portion P3 has non-linearity of such a shape, when the bumper reinforcement 1B receives a crash load, stress concentration is relatively prone to be generated on the gradually changing portion P3.

Like the first embodiment, the bumper reinforcement 1B of the fifth embodiment is fabricated by integrally forming a metal plate material (high-tension steel plate having a thickness of 1 to 4 mm for example) by means of stamping (pressing) (preferably hot-press).

Figure 22:
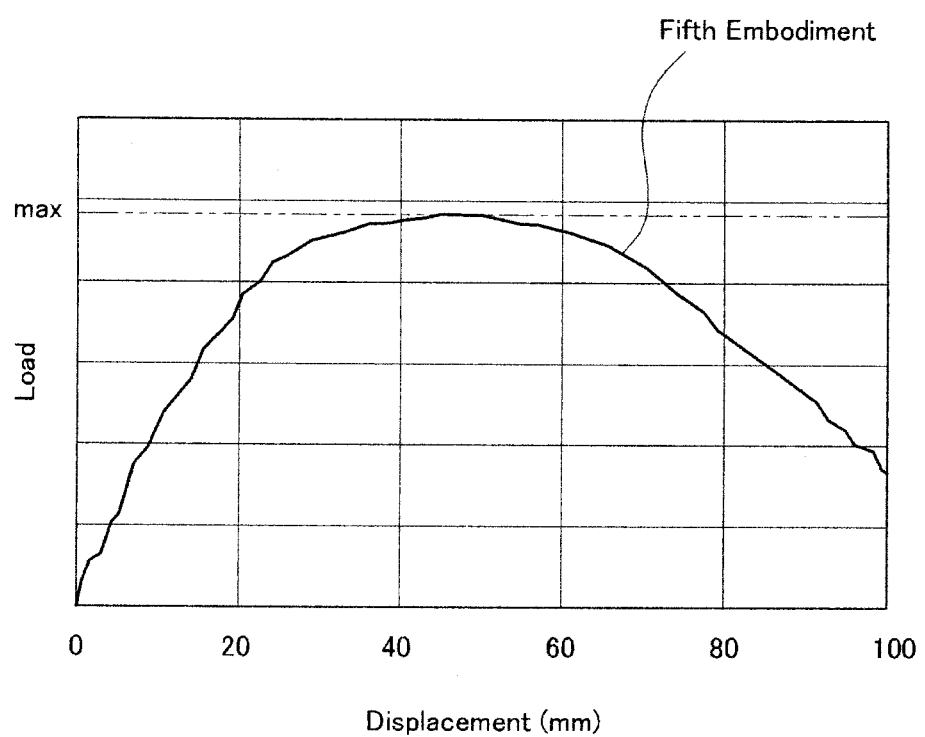
FIG. 22 is a graph showing performance characteristics of the fifth embodiment.

Performance characteristics of the bumper reinforcement 1B of the fifth embodiment were evaluated based on a three-point bending test shown in FIG. 5 as in the first embodiment. A result thereof is shown in a graph in FIG. 22. As can be found from the graph, the bumper reinforcement 1B of the fifth embodiment can stably maintain crash energy absorbing performance at the time of crash like the first embodiment.

Figure 20:
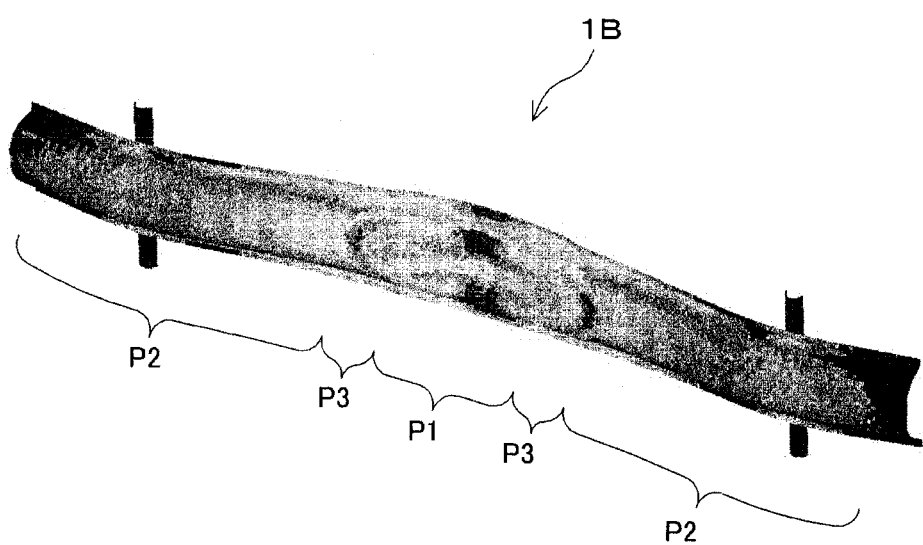
FIG. 20 is a perspective view showing deformation and stress distribution of the bumper reinforcement of the fifth embodiment after the performance evaluation test.
Figure 21:
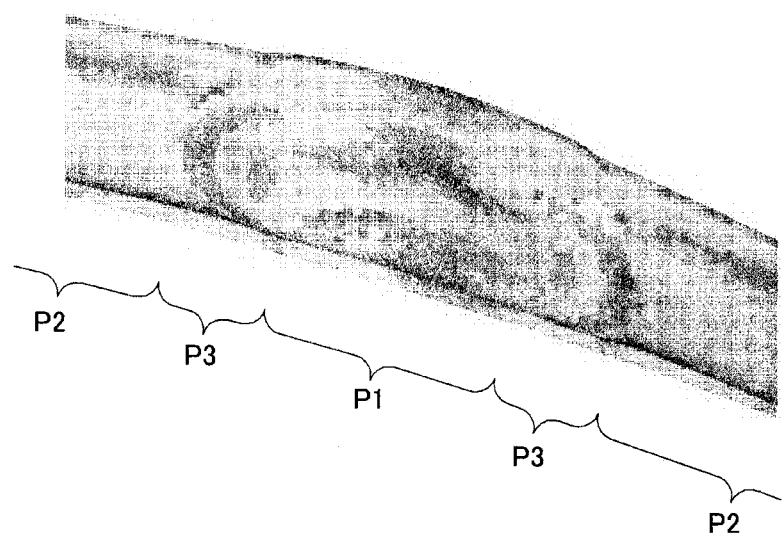
FIG. 21 is a partial enlarged view of FIG. 20.

FIG. 20 shows deformation and stress distribution of the bumper reinforcement 1B of the fifth embodiment after the performance evaluation test. FIG. 21 is a partial enlarged view of deformation and stress distribution in the vicinity of the input point 8 of the load. As can be found from FIGS. 20 and 21, the bumper reinforcement 1B of the fifth embodiment can disperse and receive a load at the time of crash at three points like the first embodiment.

Sixth Embodiment

Figure 23:
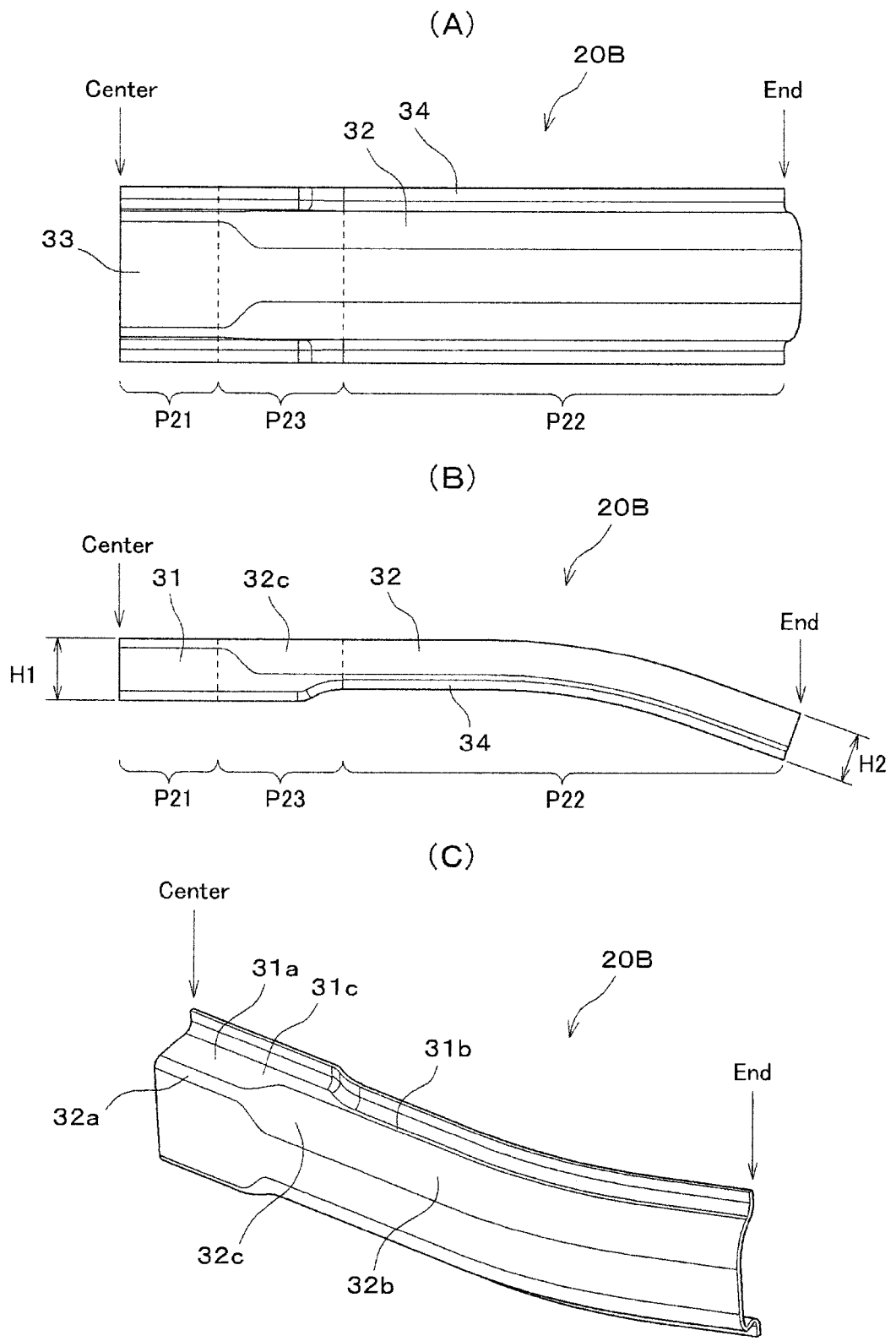

FIG. 23 show a sixth embodiment of the present invention. A basic structure of a bumper reinforcement 20B of the sixth embodiment is very similar to the structure of the door impact beam 20 of the second embodiment. Hence, in FIG. 23, member reference numbers similar to those used in FIG. 9 are allocated.

As shown in FIGS. 23(A) to 23(C), a body of the bumper reinforcement 20B includes a center flange 33, a pair of curved corners 32, a pair of walls 31 and a pair of outer flanges 34, and these points are the same as those of the fifth embodiment. In the sixth embodiment, a third section (gradually changing portion) P23 of the bumper reinforcement 20B is formed longer in the longitudinal direction than the third section P3 of the fifth embodiment.

A curved corners 32c of the third section (gradually changing portion) P23 includes a length of zone which is adjacent to a second section P22 and which maintains the same cross-sectional area as that of the second section P22, and a remaining zone which is adjacent to the first section P21. In the remaining zone, as approaching the first section P21, a cross-sectional area of the curved corners 32c becomes gradually narrow. The third section P23 includes a length of zone which is adjacent to the first section P21 and which has a cross-sectional height H1 that is the same as that of the first section, and a remaining zone which is adjacent to the second section P22. In the remaining zone, as approaching the second section P22, a cross-sectional height becomes gradually lower toward the cross-sectional height H2 at the second section.

As described above, the gradually changing portion P23 of the sixth embodiment includes the length of zone where the cross-sectional area of the curved corners 32c becomes the same as that of the curved corners 32b of the second section P22, and the length of zone having the cross-sectional height H1 that is the same as that of the first section P21. Hence, in the gradually changing portion P23 of the sixth embodiment, the shape of the curved corners 32c starts changing from a location connected with the first section P21, a position in the longitudinal direction where the cross-sectional height starts changing is close to the second section P22. Therefore, the second moment of area of the gradually changing portion P23 of the bumper reinforcement 20B of the sixth embodiment gently changes as compared with the bumper reinforcement 1B of the fifth embodiment.

Figure 24:
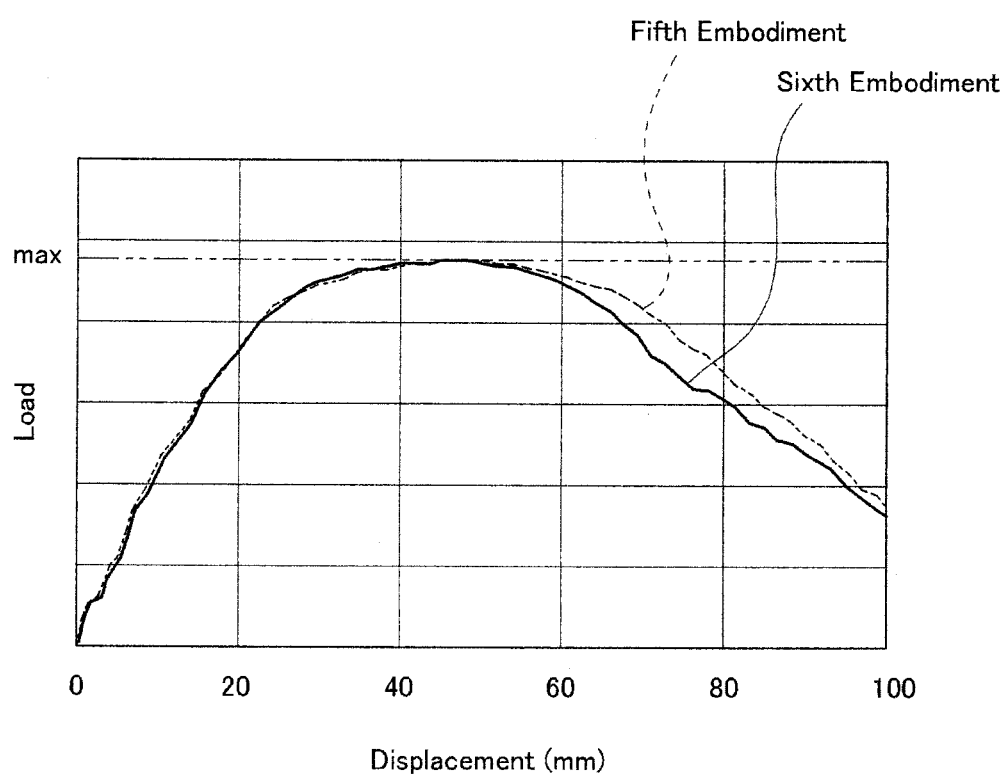
FIG. 24 is a graph showing performance characteristics of the sixth embodiment and the fifth embodiment.

A graph in FIG. 24 shows a relation between a displacement amount and a load in a three-point bending test. As shown in FIG. 24, the bumper reinforcement 20B of the sixth embodiment showed substantially the same performance as that of the fifth embodiment.

Seventh Embodiment

Figure 25:
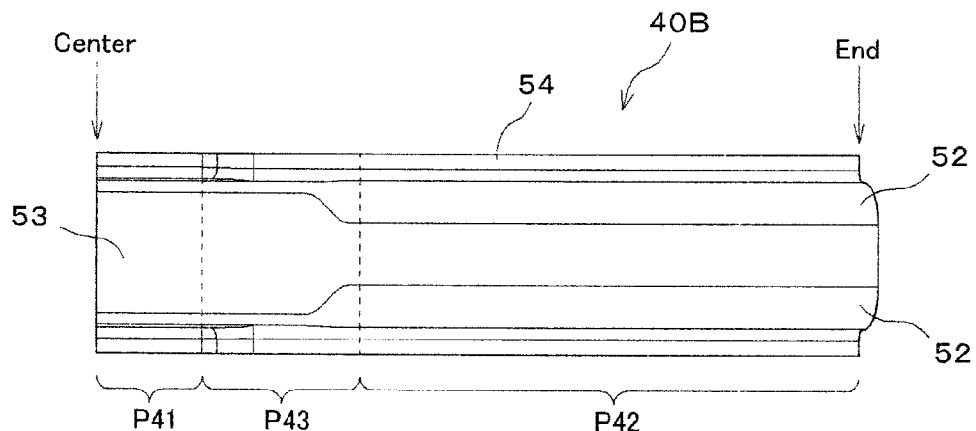
Figure 25:
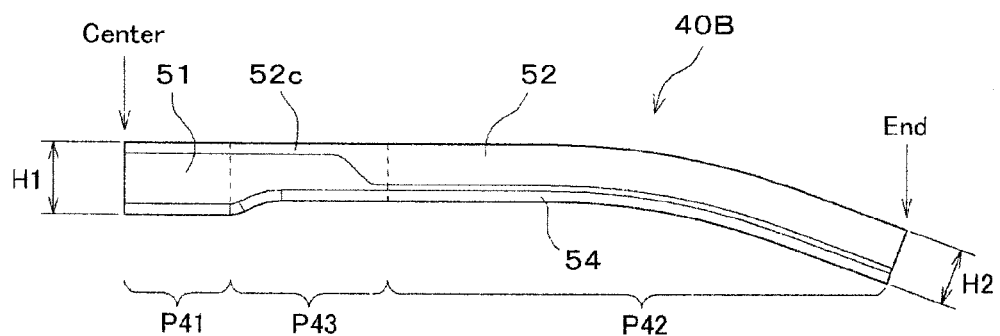
Figure 25:
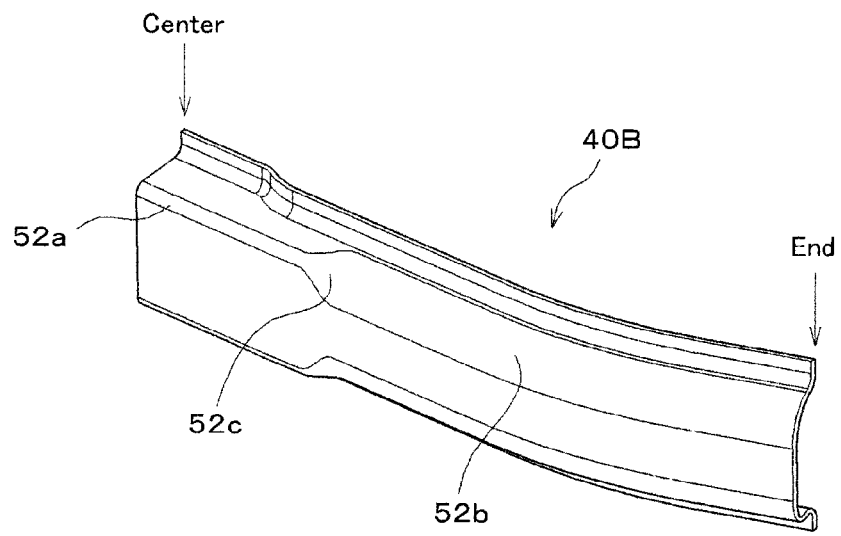

FIG. 25 show a seventh embodiment of the present invention. A basic structure of a bumper reinforcement 40B of the seventh embodiment is very similar to the structure of the door impact beam 40 of the third embodiment. Hence, in FIG. 25, member reference numbers similar to those used in FIG. 11 are allocated.

As shown in FIGS. 25(A) to 25(C), a body of the bumper reinforcement 40B includes a center flange 53, a pair of curved corners 52, a pair of walls 51 and a pair of outer flanges 54, and these points are the same as those of the fifth embodiment. In the seventh embodiment, a third section (gradually changing portion) P43 of the bumper reinforcement 40B is formed longer in the longitudinal direction than the third section P3 of the fifth embodiment.

A curved corner 52c of the third section (gradually changing portion) P43 includes a length of zone which is adjacent to the first section P41 and which maintains the same cross-sectional area as that of the first section P41, and a remaining zone which is adjacent to the second section P42. In the remaining zone, as approaching the second section P42, a cross-sectional area of the curved corner 52c becomes gradually wider toward the second section P42. The third section P43 includes a length of zone which is adjacent to the second section P42 and which has a cross-sectional height H2 that is the same as that of the second section P42, and a remaining zone which is adjacent to the first section P41. In the remaining zone, as approaching the first section P41, the cross-sectional height becomes gradually higher toward the cross-sectional height H1 at the first section.

As described above, in the gradually changing portion P43 of the seventh embodiment, a position in the longitudinal direction where the shape of the curved corner 52c starts changing is close to the second section P42, and a position in the longitudinal direction where the cross-sectional height starts changing is a position connected with the first section P41. Therefore, although the shape of the bumper reinforcement 40B of the seventh embodiment is different from that of the sixth embodiment, the seventh embodiment has the same feature as that of the sixth embodiment that the second moment of area changes gently as compared with the bumper reinforcement 1B of the fifth embodiment.

Figure 26:
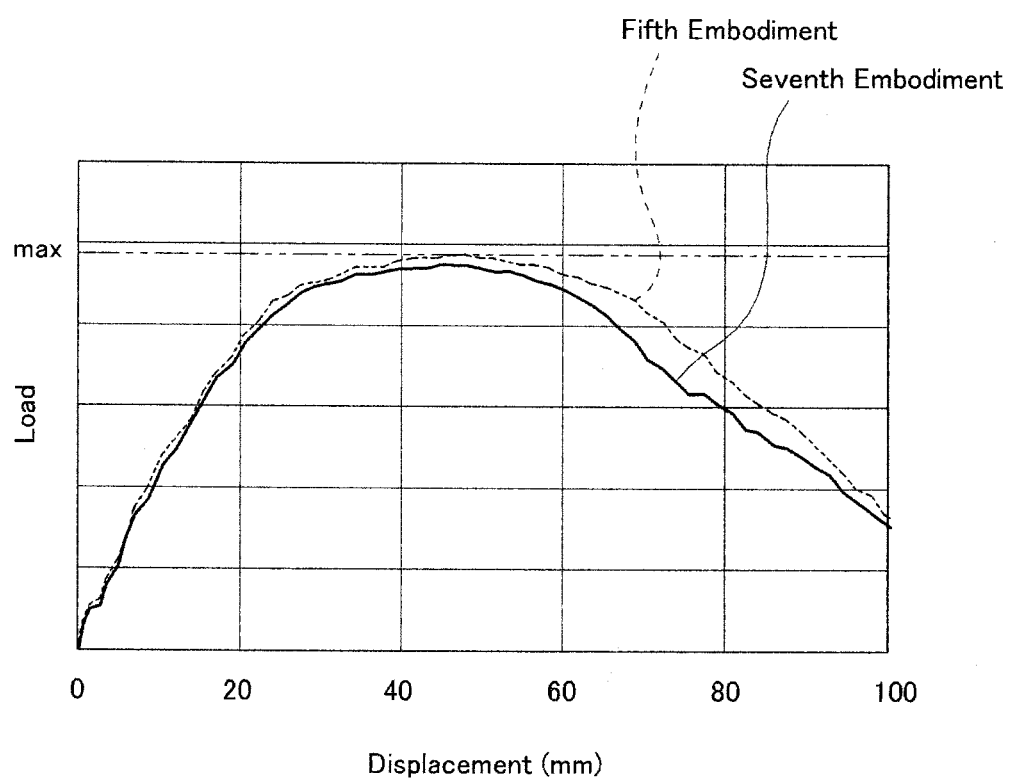
FIG. 26 is a graph showing performance characteristics of the seventh embodiment and the fifth embodiment.

A graph in FIG. 26 shows a relation between a displacement amount and a load in a three-point bending test. As can be found in FIG. 26, the bumper reinforcement 40B of the seventh embodiment showed substantially the same performance as that of the fifth embodiment.

Eighth Embodiment

Figure 27:
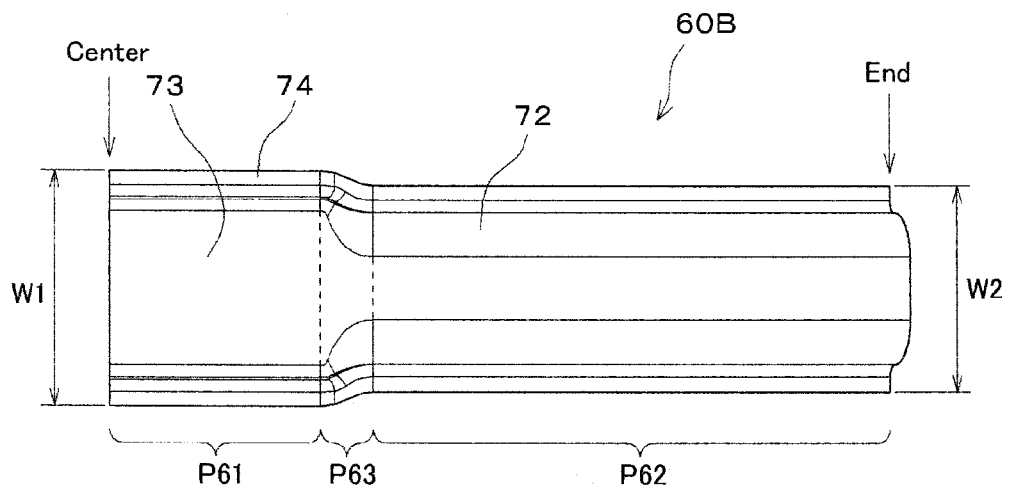
Figure 27:
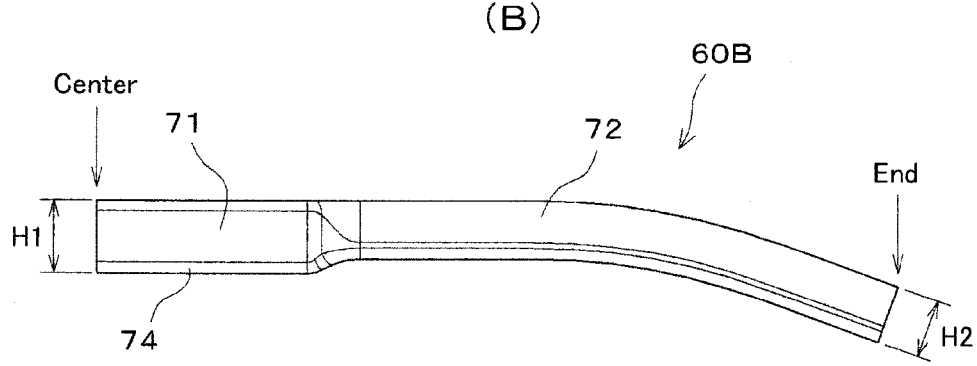
Figure 27:
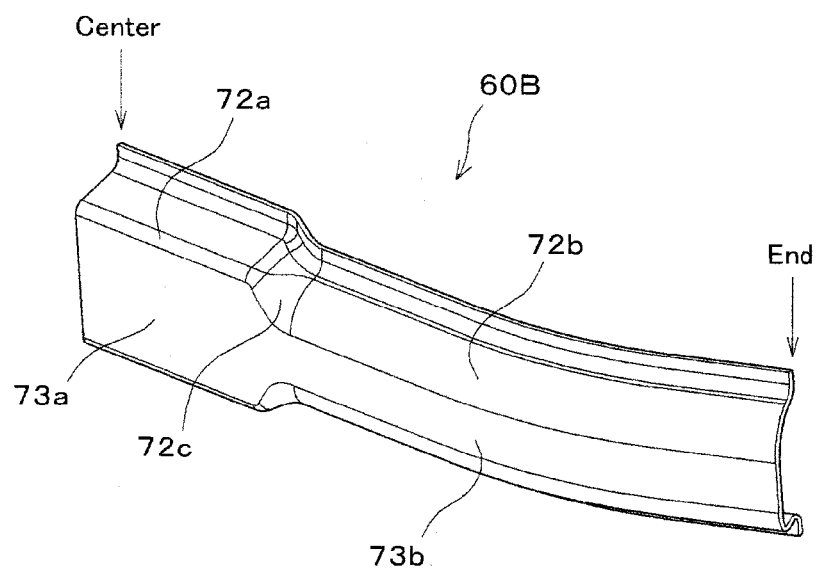

FIG. 27 show an eighth embodiment of the present invention. A basic structure of a bumper reinforcement 60B of the eighth embodiment is very similar to the structure of the door impact beam 60 of the fourth embodiment. Hence, in FIG. 27, member reference numbers similar to those used in FIG. 13 are allocated.

As shown in FIGS. 27(A) to 27(C), a body of the bumper reinforcement 60B includes a center flange 73, a pair of curved corners 72, a pair of walls 71 and a pair of outer flanges 74, and these points are the same as those of the fifth embodiment. In the eighth embodiment, a width of a center flange 73a of a first section P61 is wider than that of a center flange 73b of a second section P62. A cross-sectional area of a curved corners 72a in the first section P61 is narrower than that of a curved corners 72b in the second section P62. A cross-sectional height H1 of the first section P61 is higher than a cross-sectional height H2 of the second section P62. A third section P63 is provided as a gradually changing portion which smoothly connects the first section P61 and the second section P62 with each other. A cross-sectional height in the third section P63 gradually changes between the cross-sectional height H1 of the first section and the cross-sectional height H2 of the second section. A cross-sectional area of the curved corners 72c in the third section P63 gradually changes between a cross-sectional area of the curved corners 72a of the first section P61 and a cross-sectional area of the curved corners 72b of the second section P62.

Further, in the eighth embodiment, a width W1 of the first section P61 is wider than a width W2 of the second section P62. Since the width W1 of the first section P61 is wider than the width W2 of the second section P62, a second moment of area of the first section P61 is further greater than a second moment of area of the second section P62. According to this configuration, a load at the time of side crash can largely be dispersed toward the second section P62.

EXPLANATION OF REFERENCE NUMERALS OR SYMBOLS 1, 20, 40, 60 . . . door impact beam
1B, 20B, 40B, 60B . . . bumper reinforcement
10 . . . long body
11, 31, 51, 71 . . . wall
12, 32, 52, 72 . . . curved corner
13, 33, 53, 73 . . . center flange
14, 34, 54, 74 . . . outer flange
P1, P21, P41, P61 . . . first section P2, P22, P42, P62 ... second section
P3, P23, P43, P63 ... third section (gradually changing portion)
C1 ... width of center flange of first section
C2 ... width of center flange of second section
H1 ... cross-sectional height of first section
H2 ... cross-sectional height of second section
R1 ... radius of curved corner of first section
R2 ... radius of curved corner of second section

The invention claimed is:

1. A crash reinforcing member for a vehicle comprising a long body, the body including:
   a pair of opposed walls each having front and rear ends,
   a flat center flange disposed between the front ends of the walls,
   a pair of curved corners which connect the front ends of the walls and the center flange with each other, and
   a pair of outer flanges extending outward from the rear ends of both of the walls, in which a transverse cross-section of the body has a hat-shaped opened cross-sectional shape which opens toward the rear ends of both the walls by the pair of walls, the center flange, the pair of curved corners and the pair of outer flanges, wherein:
   the body includes a first section which occupies the center section of the body, a pair of third sections located on both sides of the first section in its longitudinal direction, and a pair of second sections which are respectively connected with the third sections and which extend to both ends of the body in the longitudinal direction, and the body has a shape which is symmetric with respect to the center section in the longitudinal direction,
   a width (C1) of the center flange in the first section is wider than a width (C2) of the center flange in the second section,
   a cross-section of each of the pair of curved corners is of an arc shape having a central angle of 90°,
   when a cross-sectional radius of the curved corner in the first section is defined as "R1" and a cross-sectional radius of the curved corner in the second section is defined as "R2," a ratio (R1/R2) of the radius R1 and the radius R2 is set in a range of 1/2 to 1/5,
   a cross-sectional height (H1) of the first section is higher than a cross-sectional height (H2) of the second section, and
   the third section is provided as a gradually changing portion which smoothly connects the first section and the second section with each other.

2. The crash reinforcing member for a vehicle according to claim 1, wherein a ratio ((H1−H2)/H1) of a difference between the cross-sectional height (H1) of the first section and the cross-sectional height (H2) of the second section and the cross-sectional height (H1) of the first section is set in a range of 1/10 to 1/2.

3. The crash reinforcing member for a vehicle according to claim 1, wherein a cross-sectional height in the third section gradually changes between the cross-sectional height (H1) of the first section and the cross-sectional height (H2) of the second section, and
   a cross-sectional area of each of the curved corners in the third section gradually changes between a cross-sectional area of each of the curved corners in the first section and a cross-sectional area of each of the curved corners in the second section.

4. The crash reinforcing member for a vehicle according to claim 1, wherein the third section includes a length of zone which is adjacent to the first section and which has a cross-sectional height (H1) that is the same as that of the first section, and a remaining zone which is adjacent to the second section, and in the remaining zone, as approaching the second section, a cross-sectional height is gradually reduced toward a cross-sectional height (H2) at the second section, and
   each of the curved corners of the third section includes a length of zone which is adjacent to the second section and which has a cross-sectional area that is the same as that of the second section, and a remaining zone which is adjacent to the first section, and in the remaining zone, a cross-sectional area of each of the curved corners is gradually reduced toward the first section.

5. The crash reinforcing member for a vehicle according to claim 1, wherein the third section includes a length of zone which is adjacent to the second section and which has a cross-sectional height (H2) that is the same as that of the second section, and a remaining zone which is adjacent to the first section, and in the remaining zone, as approaching the first section, a cross-sectional height is gradually increased toward a cross-sectional height (H1) at the first section, and
   each of the curved corners of the third section includes a length of zone which is adjacent to the first section and which has a cross-sectional area that is the same as that of the first section, and a remaining zone which is adjacent to the second section, and in the remaining zone, a cross-sectional area of each of the curved corners is gradually increased toward the second section.

\* \* \* \* \*